(12) United States Patent
Oda

(10) Patent No.: US 11,188,802 B2
(45) Date of Patent: Nov. 30, 2021

(54) IC TAG AND MANUFACTURING METHOD OF IC TAG

(71) Applicant: LAPIS SEMICONDUCTOR CO., LTD., Yokohama (JP)

(72) Inventor: Daisuke Oda, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 47 days.

(21) Appl. No.: 16/721,959

(22) Filed: Dec. 20, 2019

(65) Prior Publication Data

US 2020/0210801 A1 Jul. 2, 2020

(30) Foreign Application Priority Data

Dec. 27, 2018 (JP) .............................. JP2018-245423

(51) Int. Cl.
 *G06K 19/07* (2006.01)
 *G06K 19/077* (2006.01)

(52) U.S. Cl.
 CPC ... *G06K 19/0717* (2013.01); *G06K 19/07718* (2013.01); *G06K 19/07756* (2013.01); *G06K 19/07788* (2013.01); *G06K 19/07798* (2013.01)

(58) Field of Classification Search
 CPC combination set(s) only.
 See application file for complete search history.

(56) References Cited

U.S. PATENT DOCUMENTS

| 7,607,829 | B2 * | 10/2009 | Sumida | ................... | G01K 11/08 |
|---|---|---|---|---|---|
| | | | | | 374/106 |
| 7,667,594 | B2 * | 2/2010 | Funo | ....................... | G01K 11/06 |
| | | | | | 340/539.26 |
| 7,675,409 | B2 * | 3/2010 | Jensen | ...................... | G01K 3/04 |
| | | | | | 340/539.1 |
| 8,979,361 | B2 * | 3/2015 | Selman | ..................... | G01K 3/04 |
| | | | | | 374/104 |
| 9,607,188 | B2 * | 3/2017 | Rokhsaz | ............ | G06K 7/10148 |
| 10,769,642 | B2 * | 9/2020 | Atkinson | ........... | G06Q 10/0832 |
| 2014/0002111 | A1 * | 1/2014 | Potyrailo | ............. | G01N 27/026 |
| | | | | | 324/655 |

FOREIGN PATENT DOCUMENTS

JP 2007333484 12/2007

\* cited by examiner

*Primary Examiner* — Christle I Marshall
(74) *Attorney, Agent, or Firm* — JCIPRNET

(57) ABSTRACT

An IC tag in which precision reduction is suppressed and which is compact and manufactured easily, and a manufacturing method of IC tag are provided. The IC tag has: antennas disposed on one surface of a substrate; a capacitor which includes a dielectric and first and second electrodes disposed on one surface of the substrate, and in which an electrostatic capacitance changes irreversibly corresponding to changes in ambient environment; and an IC chip which detects the electrostatic capacitance of the capacitor via a pair of external terminals to which the first and second electrodes are respectively connected, and wirelessly transmits information based on a detection result via the antennas.

18 Claims, 22 Drawing Sheets

IC TAG AND MANUFACTURING METHOD OF IC TAG

CROSS-REFERENCE TO RELATED APPLICATION

This application claims the priority benefit of Japanese application serial no. 2018-245423, filed on Dec. 27, 2018. The entirety of the above-mentioned patent application is hereby incorporated by reference herein and made a part of this specification.

BACKGROUND OF THE DISCLOSURE

Technical Field

The disclosure relates to an IC tag and a manufacturing method thereof.

Related Art

In recent years, like frozen food or vaccine, in order to perform temperature control during transportation or storage of articles affected by changes in environment such as temperature, construction of a system using IoT (Internet of Things) has been researched and developed.

For example, a system in which a sensor is pasted to each article to perform the temperature control is proposed, the sensor including a capacitor in which electrostatic capacitance changes under a high temperature environment and an IC (integrated circuit) tag that measures impedance of the capacitor and wirelessly transmits the measured impedance information (for example, see patent literature 1: Japanese Laid-open No. 2007-333484). In this system, the impedance information that is wirelessly transmitted from the sensor is received, and judgment is made on whether this article is exposed to a high temperature above a predetermined level based on the received impedance information.

Besides, in patent literature 1, "wax" is used as a dielectric sandwiched between electrodes of the above capacitor. In the capacitor, an absorption portion that absorbs dissolved wax is arranged. According to the configuration of the capacitor, the wax is dissolved and absorbed by the absorption portion when the ambient temperature reaches a melting point of the "wax". When the "wax" is absorbed by the absorption portion, a region between the electrodes of the capacitor is filled with air. Because the dielectric constant of air is smaller than the dielectric constant of wax, the electrostatic capacitance of the capacitor decreases and the impedance increases. Accordingly, by detecting changes in the electrostatic capacitance of the capacitor based on changes in the impedance, it is possible to known whether the article is exposed to a high temperature to such a degree that the "wax" is dissolved.

However, in the configuration described in patent literature 1, the capacitor which detects the temperature changes described above should be externally attached to the IC tag and the overall size is increased.

In addition, according to this configuration, the capacitor in which the "wax" having a desired melting point is sandwiched between the electrodes is manufactured, and the manufactured capacitor is connected to the IC tag by a metal wire or the like, causing trouble in manufacturing.

Besides, in this connection processing, one end of the metal wire is connected to the electrodes of the capacitor, and the other end of the metal wire is connected to external terminals of the IC tag, and thus there are four connection points in total. Accordingly, due to the electrical resistance generated at each connection point, the detection precision of the electrostatic capacitance changes of the capacitor may be reduced.

SUMMARY

The IC tag of an embodiment of the disclosure has: a substrate; antennas disposed on one surface of the substrate; a capacitor which includes a dielectric and first and second electrodes disposed on one surface of the substrate, and in which an electrostatic capacitance changes irreversibly corresponding to changes in ambient environment; and an IC chip which includes a pair of external terminals to which the first and second electrodes are respectively connected, detects the electrostatic capacitance of the capacitor via the pair of external terminals, and wirelessly transmits information based on a detection result via the antennas.

In addition, the IC tag of an embodiment of the disclosure has: a substrate; antennas disposed on one surface of the substrate; a capacitor which includes first and second electrodes disposed on one surface of the substrate, and in which an electrostatic capacitance changes irreversibly corresponding to changes in ambient environment; an IC chip which comprises a pair of external terminals to which the first and second electrodes are respectively connected, detects the electrostatic capacitance of the capacitor via the pair of external terminals and wirelessly transmits information based on a detection result via the antennas; and a protective plate which is attached to one surface of the substrate so as to seal the antennas, the first and second electrode, and the IC chip.

A manufacturing method of IC tag of an embodiment of the disclosure has: a first process for forming, on one surface of the substrate, antennas and first and second electrodes comprising an electrically conductive material; a second process for filling a dielectric between the first and second electrodes; a third process for connecting the antennas and the first and second electrodes to external terminals of an IC chip which detects an electrostatic capacitance between the first and second electrodes and wirelessly transmits information corresponding to a detection result via the antennas; and a fourth process for attaching a protective plate which seals the antennas, the IC chip, and the first and second electrodes to one surface of the substrate.

In addition, the manufacturing method of IC tag of an embodiment of the disclosure has: a first process for forming, on one surface of the substrate, antennas and first and second electrodes comprising an electrically conductive material; a second process for connecting the antennas and the first and second electrodes to external terminals of an IC chip which detects whether an electrostatic capacitance between the first and second electrodes changes and wirelessly transmits information corresponding to a detection result via the antennas; and a third process for attaching a protective plate which seals the antennas, the IC chip, and the first and second electrodes to one surface of the substrate.

BRIEF DESCRIPTION OF THE DRAWINGS

FIG. 14B is shown.

DESCRIPTION OF THE EMBODIMENTS

Examples of the disclosure are described below in detail with reference to the drawings.

Figure 1:
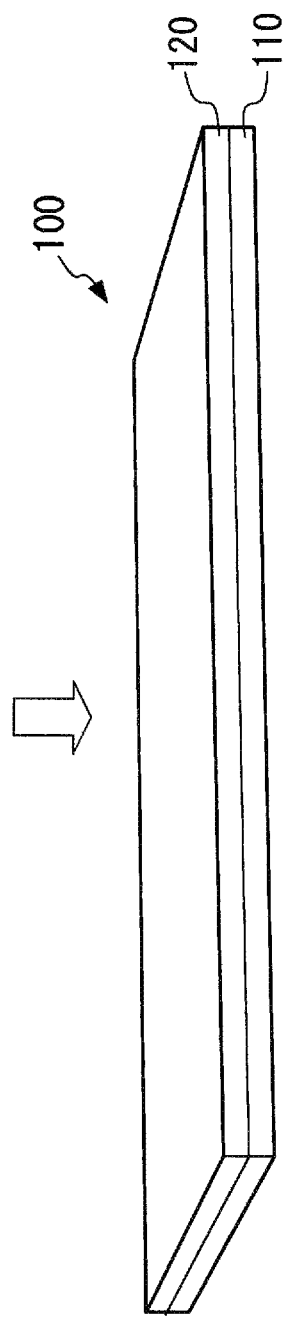
FIG. 1 is a perspective view showing an appearance of a radio frequency identification (RFID) sensor tag 100 used as an IC tag of an embodiment of the disclosure.

FIG. 1 is a perspective view showing an appearance of a passive-type RFID (Radio Frequency Identification) sensor tag 100 used as an IC tag of an embodiment of the disclosure.

The RFID sensor tag 100 includes a substrate 110 in which a plurality of devices described below is formed on one surface, and a protective plate 120 which is attached to one surface of the substrate 110 so as to cover the plurality of devices. Besides, the substrate 110 and the protective plate 120 are, for example, flexible substrates such as PET (polyethylene terephthalate) or the like.

Figure 2:
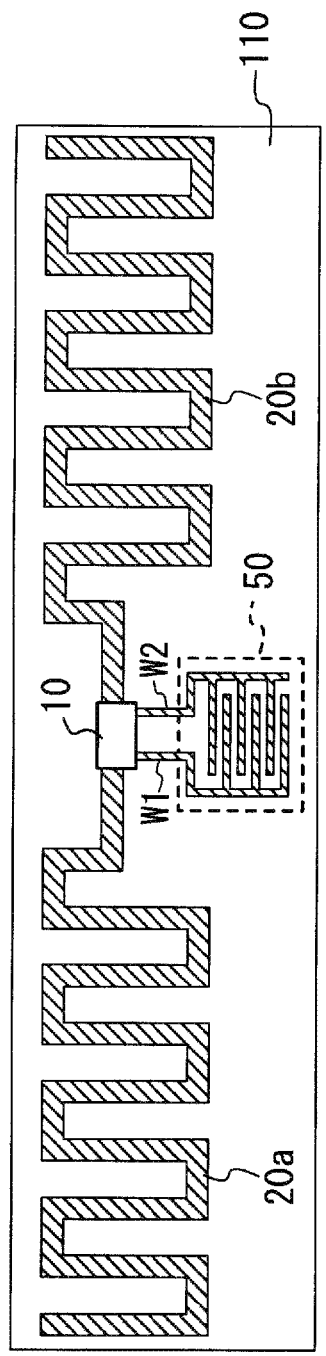
FIG. 2 is a plane view in which devices formed on one surface of a substrate 110 are viewed through a protective plate 120 of the RFID sensor tag 100 from a direction of a white arrow shown in FIG. 1.

FIG. 2 is a plane view in which the following devices formed on one surface of the substrate 110 are viewed through the protective plate 120 of the RFID sensor tag 100 from a direction of a white arrow shown in FIG. 1.

As shown in FIG. 2, devices such as an IC chip 10, a pair of antennas 20a and 20b, a sensor capacitor 50 and the like are formed on one surface of the substrate 110.

The antennas 20a and 20b comprise an electrically conductive wire material for example, and one end of each antenna is connected to an external terminal of the IC chip 10. Besides, as shown in FIG. 2, the antennas 20a and 20b are formed into a wing shape centered on the IC chip 10 on the one surface of the substrate 110.

The sensor capacitor 50 is a capacitor in which electrostatic capacitance thereof changes irreversibly according to the ambient temperature. For example, the sensor capacitor 50 has a predetermined first capacitance when the ambient temperature is below a predetermined temperature, and the electrostatic capacitance changes into an electrostatic capacitance different from the first capacitance when the ambient temperature is higher than the predetermined temperature. However, after that, the sensor capacitor 50 maintains the electrostatic capacitance after the above change even if the ambient temperature returns to a temperature below the predetermined temperature. Electrodes W1 and W2 of the sensor capacitor 50 are electrically connected to the external terminals of the IC chip 10.

Figure 3:
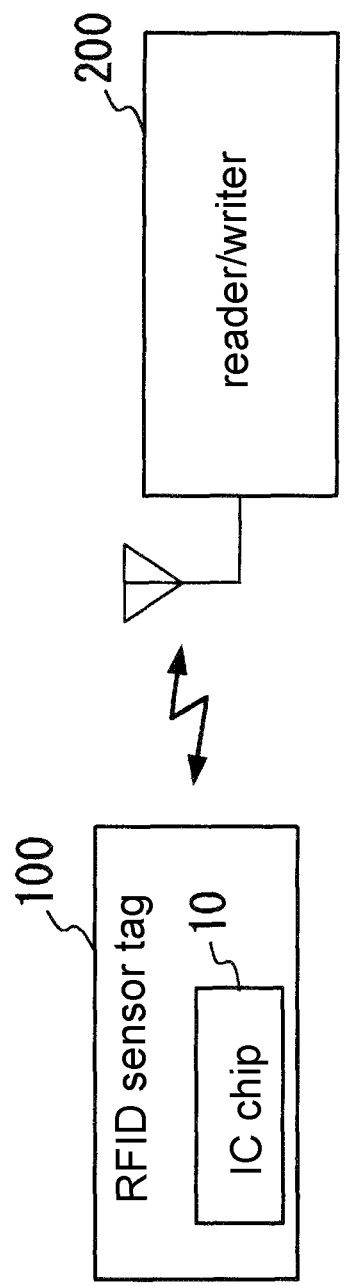
FIG. 3 is a diagram showing a form when wireless communication is performed between the RFID sensor tag 100 and a reader/writer 200.

As shown in FIG. 3, the IC chip 10 includes a communication circuit for performing near field communication using a communication radio wave of, for example, UHF (Ultra High Frequency) band, HF (High Frequency) band or LF (Low Frequency) band between the IC chip 10 and a reader/writer 200.

Figure 4:
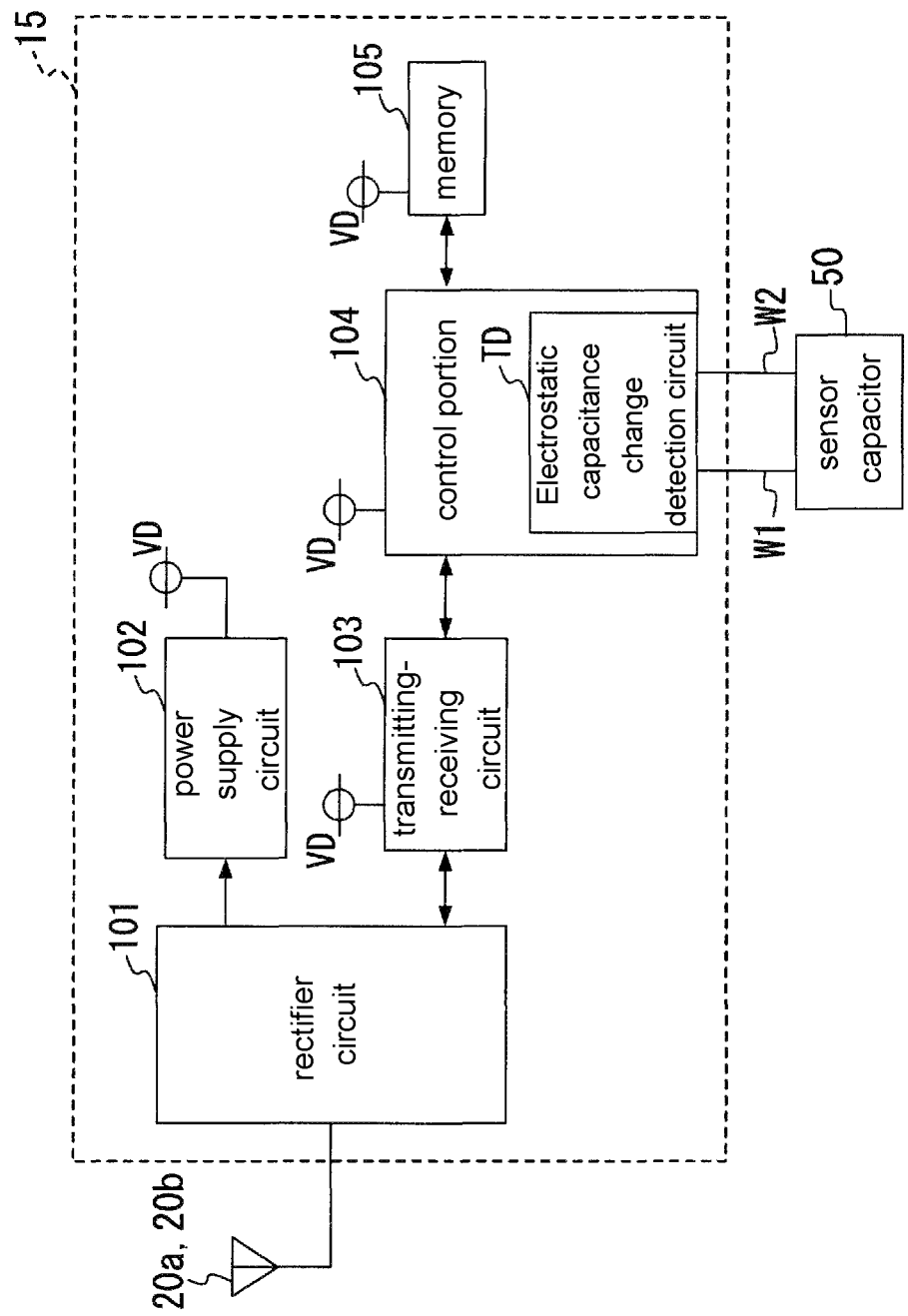
FIG. 4 is a block diagram showing a configuration of a communication circuit 15.

FIG. 4 is a block diagram showing a configuration of a communication circuit 15 included in the IC chip 10. As shown in FIG. 4, the communication circuit 15 includes a rectifier circuit 101, a power supply circuit 102, a transmitting-receiving circuit 103, a control portion 104, and a memory 105 in which an identification ID is stored.

The rectifier circuit 101 is connected to the antennas 20a and 20b. Besides, the antennas 20a and 20b supply, to the rectifier circuit 101, a high frequency signal representing received information (including command codes) and a high frequency current for power supply, the high frequency signal being obtained by receiving radio waves emitted from the reader/writer 200. The rectifier circuit 101 supplies a direct-current voltage obtained by rectifying the high frequency current to the power supply circuit 102, and supplies a signal obtained by applying rectification and detection to the high frequency signal to the transmitting-receiving circuit 103 in the form of a received signal. In addition, the rectifier circuit 101 supplies a modulation signal supplied from the transmitting-receiving circuit 103 to the antennas 20a and 20b.

The power supply circuit 102 generates a power supply voltage VD with a constant voltage value based on the direct-current voltage supplied from the rectifier circuit 101, and supplies the power supply voltage VD to the transmitting-receiving circuit 103, the control portion 104, and the memory 105. The transmitting-receiving circuit 103, the control portion 104, and the memory 105 respectively perform the following operations by receiving the supply of the power supply voltage VD.

The transmitting-receiving circuit 103 acquires a command code by applying demodulation processing to the received signal supplied from the rectifier circuit 101, and supplies the command code to the control portion 104. In addition, the transmitting-receiving circuit 103 supplies the above modulation signal to the rectifier circuit 101, the above modulation signal being a signal obtained by modulating a carrier wave signal corresponding to a bandwidth of the above communication radio wave according to the identification ID and environmental change information supplied from the control portion 104.

The control portion 104 includes an electrostatic capacitance change detection circuit TD which detects, based on the voltage of the electrodes W1 and W2 of the sensor capacitor 50, whether the electrostatic capacitance of the sensor capacitor 50 changes.

Figure 5:
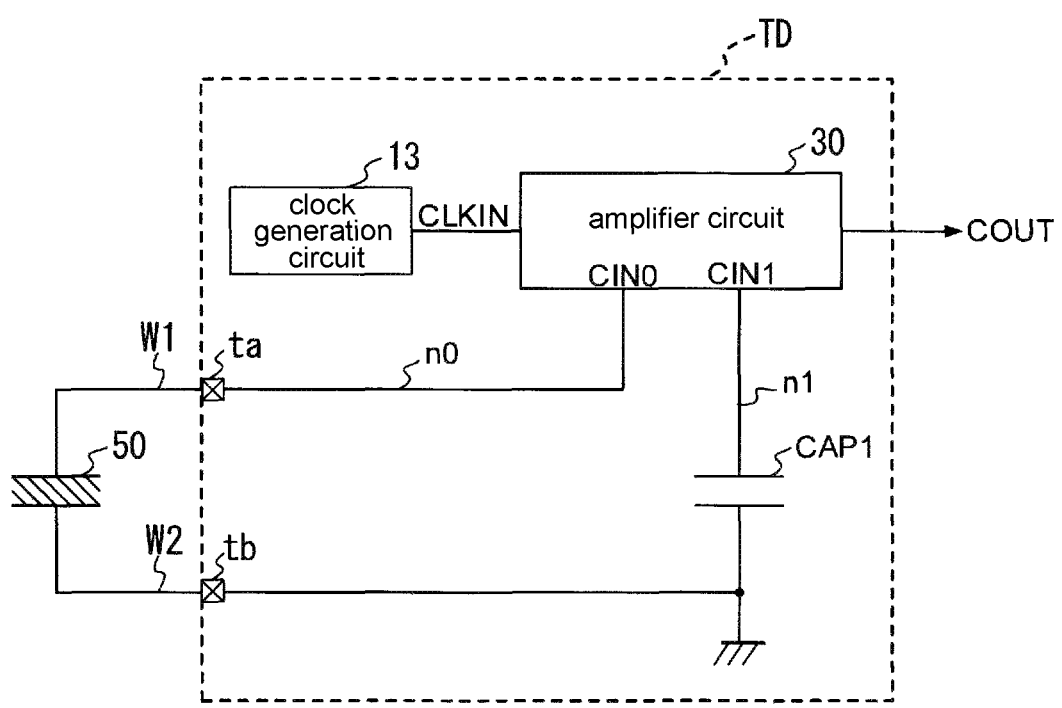
FIG. 5 is a block diagram showing a configuration of an electrostatic capacitance change detection circuit TD.

FIG. 5 is a block diagram showing a configuration of the electrostatic capacitance change detection circuit TD.

As shown in FIG. 5, the electrostatic capacitance change detection circuit TD includes a clock generation circuit 13, an amplifier circuit 30, and a capacitor CAP1.

Besides, in FIG. 5, the electrode W1 of the sensor capacitor 50 is connected to a pad ta which is an external terminal of the IC chip 10, and the electrode W2 is connected to a pad tb which is an external terminal of the IC chip 10. The pad ta is connected to a connection terminal CIN0 of the amplifier circuit 30 via a node n0.

The capacitor CAP1 is a capacitor having a fixed electrostatic capacitance, and the electrostatic capacitance thereof is a capacitance value between the above-described first capacitance and a predetermined second capacitance lower than the first capacitance. In other words, the capacitor CAP1 is a reference capacitor which provides an electrostatic capacitance serving as a threshold for judging whether the electrostatic capacitance of the sensor capacitor 50 changes from the first capacitance to another capacitance. One electrode of the two electrodes of the capacitor CAP1 is connected to the above-described pad tb. Furthermore, a ground potential is applied to the one electrode. The other electrode of the capacitor CAP1 is connected to a connection terminal CIN1 of the amplifier circuit 30 via a node n1.

The clock generation circuit 13 generates an oscillation signal having a predetermined frequency, and supplies the oscillation signal to the amplifier circuit 30 as a clock signal CLKIN.

Figure 6:
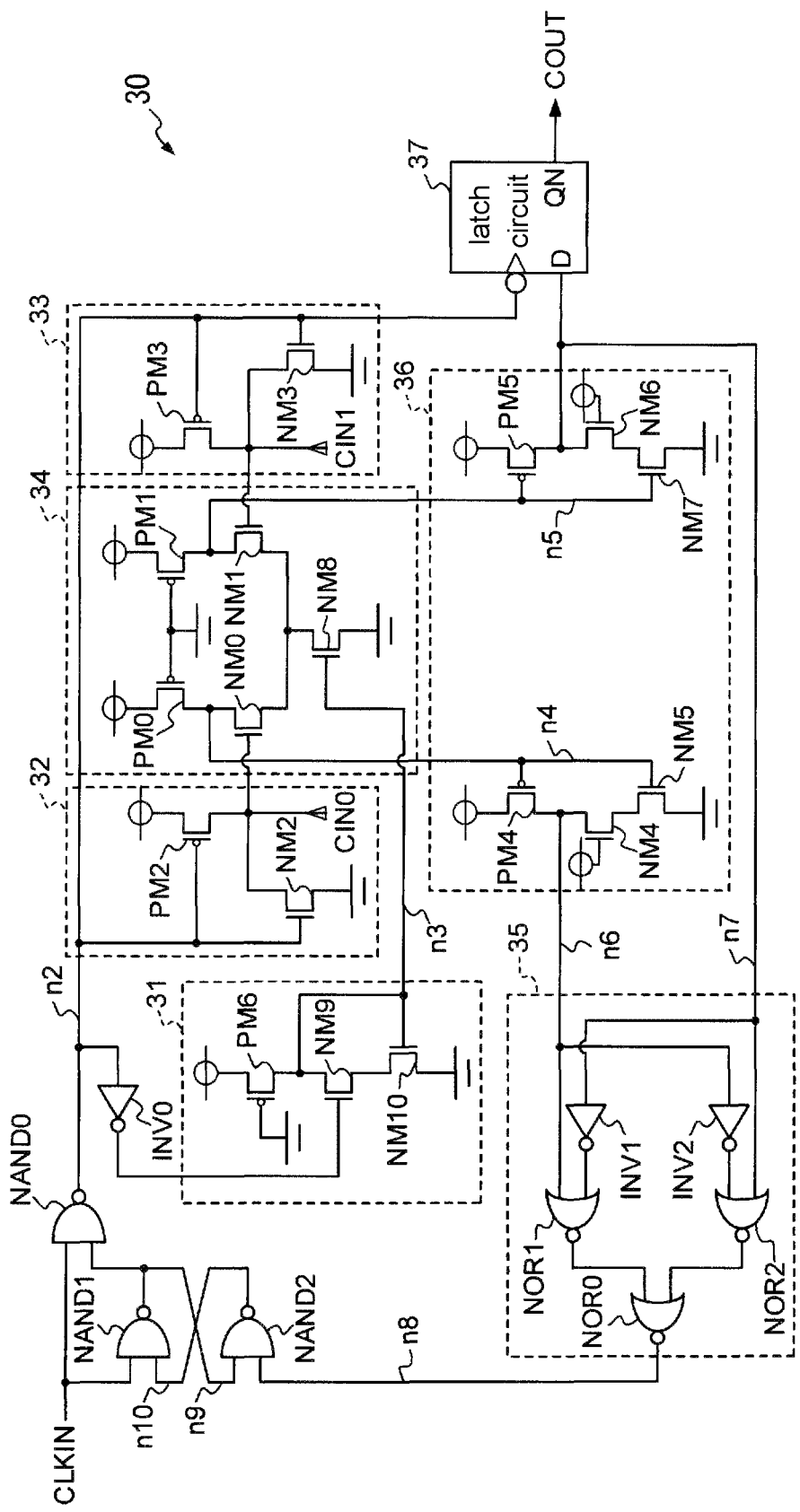
FIG. 6 is a circuit diagram showing one example of an amplifier circuit 30.

FIG. 6 is a circuit diagram showing one example of the amplifier circuit 30.

The amplifier circuit 30 includes a plurality of logical gates, a plurality of transistors, and a latch circuit.

A NAND0, a NAND1, and a NAND2 shown in FIG. 6 are two-input NAND gate circuits which output NOT AND. The clock signal CLKIN is supplied to one input end of the NAND0. The NAND1 and NAND2 constitute a flip-flop circuit. The clock signal CLKIN is supplied to one input end of the NAND1. An output end of the NAND1 is connected to the other input end of the NAND0. One input end of the NAND2 is connected together with the output end of the NAND1 to the other input end of the NAND0 via a node n9. An output terminal of the NAND2 is connected to the other input end of the NAND1 via a node n10. An input end of an inverter INV0 is connected to an output terminal of the NAND0 via a node n2. The inverter INV0 inverts an output signal of the NAND0 that is input to the input end, and outputs the inverted signal from the output end.

Furthermore, the amplifier circuit 30 has a bias signal generation portion 31, a first capacitor control portion 32, a second capacitor control portion 33, a differential amplifier 34, an exclusive OR circuit 35, an inverter portion 36, and a latch circuit 37.

The bias signal generation portion 31 is a signal generation portion which generates a bias signal supplied to the differential amplifier 34 based on the output signal of the inverter INV0. The bias signal generation portion 31 supplies the generated bias signal to the differential amplifier 34. By the supply of the bias signal, an operation current of the differential amplifier 34 is controlled. The bias signal generation portion 31 includes a transistor PM6, a transistor NM9, and a transistor NM10. The transistor PM6 is configured by a P-channel MOSFET (Metal Oxide Semiconductor Field Effect Transistor) which is a transistor of a first conductivity type. In the transistor PM6, the source is connected to the power supply, the gate is grounded, and the drain is connected to a node n3. The transistors NM9 and NM10 are respectively configured by an N-channel MOSFET which is a transistor of a second conductivity type. In the transistor NM9, the gate is connected to the output end of the inverter INV0, and the drain is connected to the node n3. In the transistor NM10, the source is grounded, and the gate is connected to the node n3. The source of the transistor NM9 and the drain of the transistor NM10 are connected to each other.

The first capacitor control portion 32 is a control portion which controls charge/discharge of the sensor capacitor 50. The first capacitor control portion 32 includes a transistor PM2 and a transistor NM2. The transistor PM2 is configured by a P-channel MOSFET which is a transistor of the first conductivity type. In the transistor PM2, the source is connected to the power supply, and the gate is connected to the node n2. The transistor NM2 is configured by an N-channel MOSFET which is a transistor of the second conductivity type. In the transistor NM2, the source is grounded, and the gate is connected to the node n2. The drain of the transistor PM2 and the drain of the transistor NM2 are connected to one end of the sensor capacitor 50 via the connection terminal CIN0.

The second capacitor control portion 33 is a control portion which controls charge/discharge of the capacitor CAP1. The second capacitor control portion 33 includes a transistor PM3 and a transistor NM3. The transistor PM3 is configured by a P-channel MOSFET which is a transistor of the first conductivity type. In the transistor PM3, the source is connected to the power supply, and the gate is connected to the node n2. The transistor NM3 is configured by an N-channel MOSFET which is a transistor of the second conductivity type. In the transistor NM3, the source is grounded, and the gate is connected to the node n2. The drain of the transistor PM3 and the drain of the transistor NM3 are connected to one end of the capacitor CAP1 via the connection terminal CIN1.

The differential amplifier 34 is a differential amplifier circuit which amplifies and outputs a potential difference of charging potential of the sensor capacitors 50 and the capacitor CAP1. The differential amplifier 34 includes transistors PM0, PM1, NM0, NM1, and NM8. The transistors PM0 and PM1 are respectively configured by a P-channel MOSFET which is a transistor of the first conductivity type. In the transistors PM0 and PM1, the respective source is connected to the power supply, and the gates are connected to each other and are commonly grounded. The transistors NM0 and NM1 are respectively configured by an N-channel MOSFET which is a transistor of the second conductivity type. The drain of the transistors NM0 is connected to the drain of the transistor PM0. The gate of the transistor NM0 is connected to the drain of the transistor PM2 and the drain of the transistor NM2, and is connected to one end of the sensor capacitor 50 via the connection terminal CIN0. The drain of the transistor NM1 is connected to the drain of the transistor PM1. The gate of the transistor NM1 is connected to the drain of the transistor PM3 and the drain of the transistor NM3, and is connected to one end of the capacitor CAP1 via the connection terminal CIN1. In the transistor NM8, the source is grounded, and the drain is connected to the sources of the transistors NM0 and NM1. The gate of the transistor NM8 is connected to the node n3, and is connected, via the node n3, to the gate of the transistor NM10, the drain of the transistor PM6, and the drain of the transistor NM9. The transistor NM8 operates as a constant current source circuit, and a constant current (tail current) is controlled according to the bias signal (that is, the potential of the node n3) from the bias signal generation portion 31.

The exclusive OR circuit 35 is a logic circuit which outputs the exclusive OR thereof to a node n8 using signals on nodes n6 and n7 as input. The exclusive OR circuit 35 includes a NOR0, a NOR1, a NOR2, an inverter INV1, and an inverter INV2. An input end of the inverter INV1 is connected to the node n7. The inverter INV1 inverts the signal on the node n7 input to the input end, and outputs the inverted signal from the output end. An input end of the inverter INV2 is connected to the node n6. The inverter INV2 inverts the signal on the node n6 input to the input end, and outputs the inverted signal from the output end.

The NOR0, NOR1, and NOR2 are two-input NOR gate circuits which output NOT OR. One input end of the NOR0 is connected to an output end of the NOR1, and the other input end is connected to an output end of the NOR2. An output end of the NOR0 is connected to one input end of the NAND2 via the node n8. One input end of the NOR1 is connected to the node n6, and the other input end is connected to the output end of the inverter INV1. One input end of the NOR2 is connected to the output end of the inverter INV2, and the other input end is connected to the node n7.

The inverter portion 36 is a circuit portion which inverts the output signal from the differential amplifier 34 and outputs the inverted signal. The inverter portion 36 includes transistors PM4, PM5, NM4, NM5, NM6, and NM7. The transistor PM4 is configured by a P-channel MOSFET which is a transistor of the first conductivity type. In the transistor PM4, the source is connected to the power supply, and the gate is connected to a node n4. The transistor NM4 is configured by an N-channel MOSFET which is a transistor of the second conductivity type. In the transistor NM4, the gate is connected to the power supply, and the drain is connected to the node n6 in common with the drain of the transistor PM4. The transistor NM5 is configured by an N-channel MOSFET which is a transistor of the second conductivity type. In the transistor NM5, the source is grounded, the drain is connected to the source of the transistor NM4, and the gate is connected to the node n4. The transistor PM5 is configured by a P-channel MOSFET which is a transistor of the first conductivity type. In the transistor PM5, the source is connected to the power supply, and the gate is connected to a node n5. The transistor NM6 is configured by an N-channel MOSFET which is a transistor of the second conductivity type. In the transistor NM6, the gate is connected to the power supply, and the drain is connected to the node n7 in common with the drain of the transistor PM5. The transistor NM7 is configured by an N-channel MOSFET which is a transistor of the second conductivity type. In the transistor NM7, the source is grounded, the drain is connected to the source of the transistor NM6, and the gate is connected to the node n5.

The transistors PM0 and PM1 are formed with the same dimensions (gate length, gate width and the like). Similarly, the transistors PM2 and PM3, PM4 and PM5, NM0 and NM1, NM2 and NM3, NM4 and NM6, and NM5 and NM7 are respectively formed with the same dimensions.

When a clock signal input to the clock terminal of the latch circuit 37, that is, a signal of the node n2 is at L level (that is, ground potential level), the latch circuit 37 captures a data signal input to a signal input terminal D, that is, a data signal of the node n7. Then, when the clock signal input to the clock terminal of the latch circuit 37 transitions from L level to H level (that is, the power supply potential level), the latch circuit 37 outputs an inversion signal of the data signal captured as described above as a detection signal COUT. After that, the latch circuit 37 continues to output the detection signal COUT maintaining that value until the clock signal input to the clock terminal transitions from L level to H level again.

Accordingly, first, the electrostatic capacitance change detection circuit TD having the amplifier circuit 30 shown in FIG. 6 charges the sensor capacitor 50 and the capacitor CAP1 according to the clock signal CLKIN. Next, the electrostatic capacitance change detection circuit TD judges whether the electrostatic capacitance of the sensor capacitor 50 is the first capacitance based on a charge potential difference of each of the sensor capacitor 50 and the capacitor CAP1. Then, the judgment result is output as the detection signal COUT representing whether the electrostatic capacitance of the sensor capacitor 50 changes.

The control portion 104 generates, based on the detection signal COUT, environmental change information showing whether there is a chance for the RFID sensor tag 100 to be exposed to a high temperature environment above the predetermined temperature up to now.

That is, when the detection signal COUT represents that the electrostatic capacitance of the sensor capacitor 50 is the first capacitance, judgment can be made that there is no chance for the RFID sensor tag 100 to be exposed to the high temperature environment above the predetermined temperature up to now. Therefore, in this case, the control portion 104 generates environmental change information representing that there is no chance for the RFID sensor tag 100 to be exposed to the high temperature environment above the predetermined temperature. On the other hand, when the detection signal COUT represents that the electrostatic capacitance of the sensor capacitor 50 changes to an electrostatic capacitance other than the first capacitance, judgment can be made that there is a chance for the RFID sensor tag 100 to be exposed to the high temperature environment above the predetermined temperature up to now. Therefore, in this case, the control portion 104 generates environmental change information representing that there is a chance for the RFID sensor tag 100 to be exposed to the high temperature environment above the predetermined temperature.

Then, the control portion 104 reads out the identification ID from the memory 105 corresponding to the command code supplied from the transmitting-receiving circuit 103, and supplies the identification ID together with the above-described environmental change information to the transmitting-receiving circuit 103. Accordingly, the transmitting-receiving circuit 103 emits a communication radio wave representing the above-described identification ID and environmental change information to the space via the rectifier circuit 101 and the antennas 20a and 20b. Then, the reader/writer 200 shown in FIG. 3 acquires the identification ID and the environmental change information of the RFID sensor tag 100 by receiving the communication radio wave.

In summary, the IC chip 10 including the communication circuit 15 shown in FIG. 4 includes a pair of external terminals (ta, tb) to which the electrodes W1 and W2 of the sensor capacitor 50 are respectively connected. The IC chip 10 detects the electrostatic capacitance of the sensor capacitor 50 via the pair of external terminals, and wirelessly transmits information based on the detection result (for example, the environmental change information) via the antennas 20a and 20b.

Next, a structure of the sensor capacitor 50 in which the electrostatic capacitance of the sensor capacitor 50 changes irreversibly according to the ambient temperature is described.

Figure 7A:
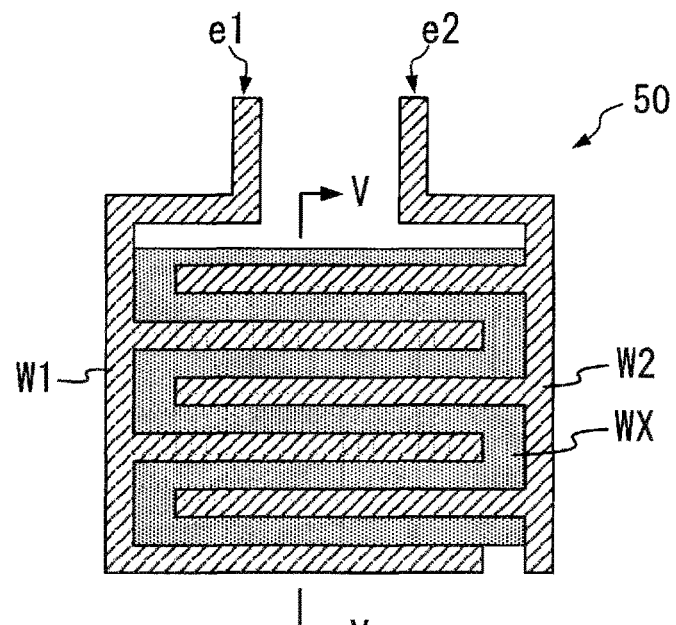
FIG. 7A is a plane view in which a sensor capacitor 50 of a first example is viewed through the protective plate 120 from the direction of the white arrow shown in FIG. 1.

FIG. 7A is a plane view in which the sensor capacitor 50 of a first example is viewed through the protective plate 120 from the direction of a white arrow shown in FIG. 1. In addition, FIG. 7B is a cross-sectional view showing a cross-sectional structure of the sensor capacitor 50 along a V-V line shown in FIG. 7A.

Figure 7B:
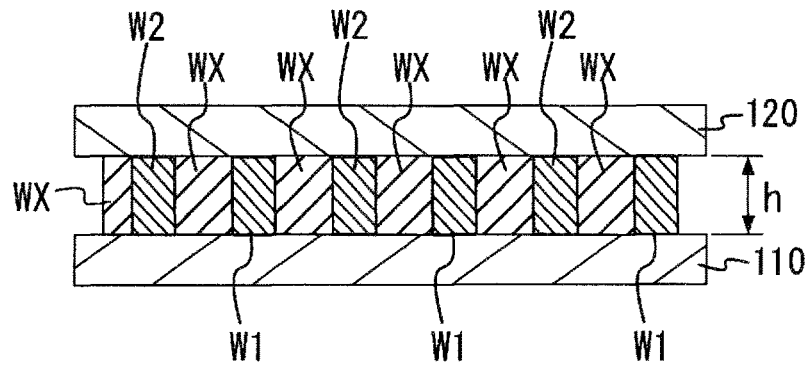
FIG. 7B is a cross-sectional view showing a cross-sectional structure of the sensor capacitor 50 along a V-V line shown in FIG. 7A.

As shown in FIG. 7A and FIG. 7B, the sensor capacitor 50 includes comb-shaped electrodes W1 and W2 that are disposed on one surface of the substrate 110 and along the one surface, and wax WX that is filled between comb teeth of respective electrodes W1 and W2. The wax WX plays the role of a dielectric of the capacitor.

As shown in FIG. 7A, the electrodes W1 and W2 have a comb-shaped plane pattern in which the comb teeth of the electrodes are disposed facing each other in a manner of being alternately juxtaposed. The electrodes W1 and W2 comprise the same electrically conductive material as the antennas 20a and 20b for example, and an end portion e1 of the electrode W1 and an end portion e2 of the electrode W2 shown in FIG. 7A are connected to the external terminals of the IC chip 10. Besides, as shown in FIG. 7B, for example, a height h of each of the electrodes W1 and W2 from one surface of the substrate 110 is, for example, equal to the height in the antennas 20a and 20b from one surface of the substrate 110.

Meanwhile, when the ambient temperature is lower than a melting point of the wax WX, as shown in FIG. 7B, the wax WX maintains a solid state of being fully filled between the electrodes W1 and W2.

On the other hand, when the ambient temperature is higher than the melting point of the wax WX, the wax WX liquefies, and a part or all of the wax WX flows out of a region between the electrodes W1 and W2.

Figure 7C:
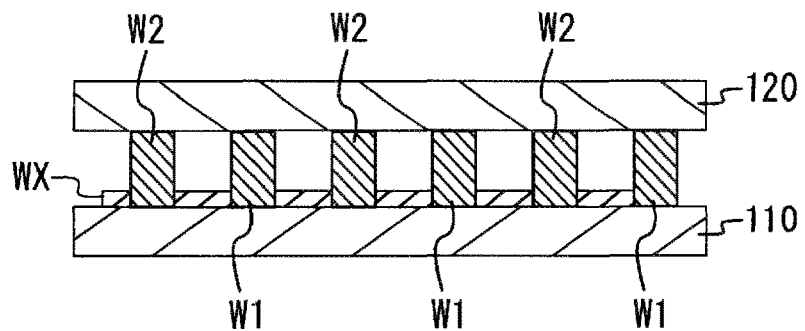
FIG. 7C is a cross-sectional view showing a cross-sectional structure of the sensor capacitor 50 along the V-V line shown in FIG. 7A after being exposed to a temperature higher than a predetermined temperature.

Accordingly, in this case, as shown in FIG. 7C, in the region between the electrodes W1 and W2, the proportion of air having a lower dielectric constant than the wax WX increases, and the electrostatic capacitance of the sensor capacitor 50 decreases compared with the state shown in FIG. 7B.

For example, when the wax WX having a melting point of 20° C. is adopted, the wax WX liquefies if the ambient temperature exceeds 20° C., and flows out of the region between the electrodes W1 and W2, and thereby the electrostatic capacitance of the sensor capacitor 50 changes (decreases). Besides, the wax that has flowed out of the region between the electrodes W1 and W2 does not return even if the ambient temperature is lower than 20° C. afterwards, and thus the sensor capacitor 50 maintains the electrostatic capacitance after the above change.

In summary, the sensor capacitor 50 includes the electrodes W1 and W2 and the wax WX used as a dielectric, and the electrostatic capacitance of the sensor capacitor 50 changes irreversibly corresponding to the ambient temperature in a state without power supply.

Accordingly, during the power supply from the reader/writer 200 as shown in FIG. 3, confirmation can be made on whether the RFID sensor tag 100 is exposed to a high temperature (for example, 20° C. or higher) environment by detecting the changes in the electrostatic capacitance of the sensor capacitor 50.

Here, in the RFID sensor tag 100, as described above, the electrodes W1 and W2 constituting the sensor capacitor 50 and the antennas 20a and 20b for wireless communication are disposed on one surface of the substrate 110 and along this surface.

Accordingly, when the RFID sensor tag 100 is manufactured, in a process of forming the electrically conductive material for one time, the electrodes W1 and W2 described above can be formed together with the antennas 20a and 20b, and thus the manufacturing is facilitated.

Furthermore, the electrodes W1 and W2 are formed of the same electrically conductive material as the antennas 20a and 20b, and the height h of the electrodes W1 and W2 shown in FIG. 7B is equal to the height of the antennas 20a and 20b from the surface of the substrate, and thereby manufacturing time can be shortened.

Meanwhile, when the changes in the electrostatic capacitance of the sensor capacitor 50 are detected, the larger the electrostatic capacitance when the wax WX is in a solid state, the larger the difference with the electrostatic capacitance when the wax liquefies and flows out, and thus the detection precision of the electrostatic capacitance change detection circuit TD increases.

However, when the height h of the electrodes W1 and W2 shown in FIG. 7B is made the same as the height of the antennas 20a and 20b, the electrode area in which the electrodes W1 and W2 face each other decreases, and thus it is difficult to increase the electrostatic capacitance of the capacitor.

Therefore, in the RFID sensor tag 100, the comb-shaped electrodes in which the comb teeth of the electrodes are disposed facing each other in a manner of being alternately juxtaposed as shown in FIG. 7A are adopted as the electrodes W1 and W2 of the sensor capacitor 50, and thereby increase in the electrode area is achieved. Besides, the electrostatic capacitance of the sensor capacitor 50 can be adjusted according to the interval and the number of the comb teeth of the electrodes W1 and W2.

Furthermore, in the RFID sensor tag 100, the electrodes W1 and W2 are directly connected to the pair of external terminals to and tb of the IC chip 10. In other words, the electrodes W1 and W2 constituting the sensor capacitor 50 also serve as wire materials for electrically connecting the sensor capacitor 50 and the IC chip 10. In this way, when the sensor capacitor 50 is connected to the IC chip 10, it is unnecessary to use a metal wire or the like, and the number of connection points can be reduced.

Accordingly, according to the configuration of the RFID sensor tag 100 as described above, manufacturing can be facilitated and reduction in detection precision of the electrostatic capacitance can be suppressed.

Besides, in the configuration shown in FIG. 7A and FIG. 7B, the wax WX is filled only between the electrode W1 and the electrode W2, but the wax WX may also be formed to cover not only the space between the electrodes but also uniformly cover the surface of the electrode W1 and the electrode W2.

Figure 8A:
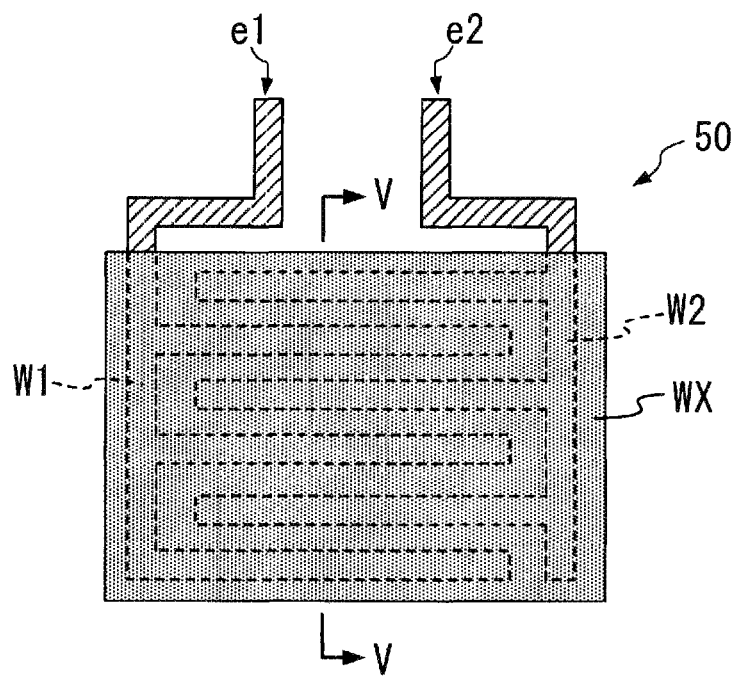
FIG. 8A is a plane view showing a variant of the sensor capacitor 50 having the configuration shown in FIG. 7A.
Figure 8B:
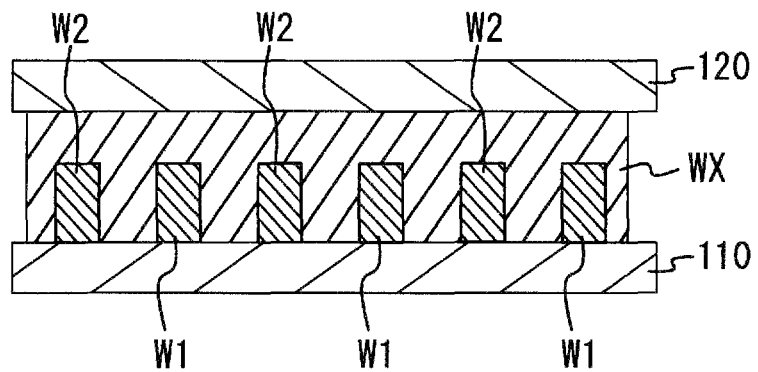
FIG. 8B is a cross-sectional view showing a cross-sectional structure of the sensor capacitor 50 along a V-V line shown in FIG. 8A.

FIG. 8A and FIG. 8B are diagrams showing a variant of the sensor capacitor 50 shown in FIG. 7A and FIG. 7B which is accomplished in view of this point. Besides, FIG. 8A is a plane view in which the sensor capacitor 50 is viewed through the protective plate 120 from the direction of the white arrow shown in FIG. 1, and FIG. 8B is a cross-sectional view showing a cross-sectional structure of the sensor capacitor 50 along a V-V line shown in FIG. 8A.

Figure 9:
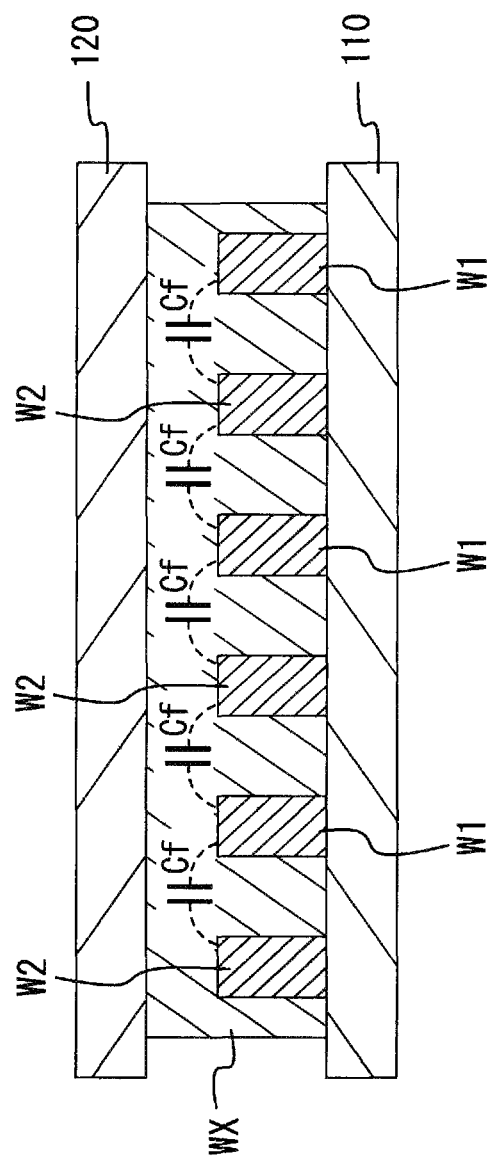
FIG. 9 is a cross-sectional view showing a cross-sectional structure along the V-V line shown in FIG. 8A, the cross-sectional view representing a parasitic capacitance Cf of wax WX included in the sensor capacitor 50 having the configuration shown in FIG. 8A and FIG. 8B.

In the configuration shown in FIG. 8A and FIG. 8B, due to the wax WX which is formed to uniformly cover the space between the electrodes W1 and W2 and the space between the electrodes W1 and W2 and the protective plate 120, as shown in FIG. 9, a parasitic capacitance Cf generated by a leakage electric field between the electrodes is added. Accordingly, the electrostatic capacitance of the sensor capacitor 50 can be increased.

In addition, in the configuration shown in FIG. 8A and FIG. 8B, an absorption material for absorbing the liquefied wax may be disposed adjacent to the formation region of the wax WX.

Figure 10A:
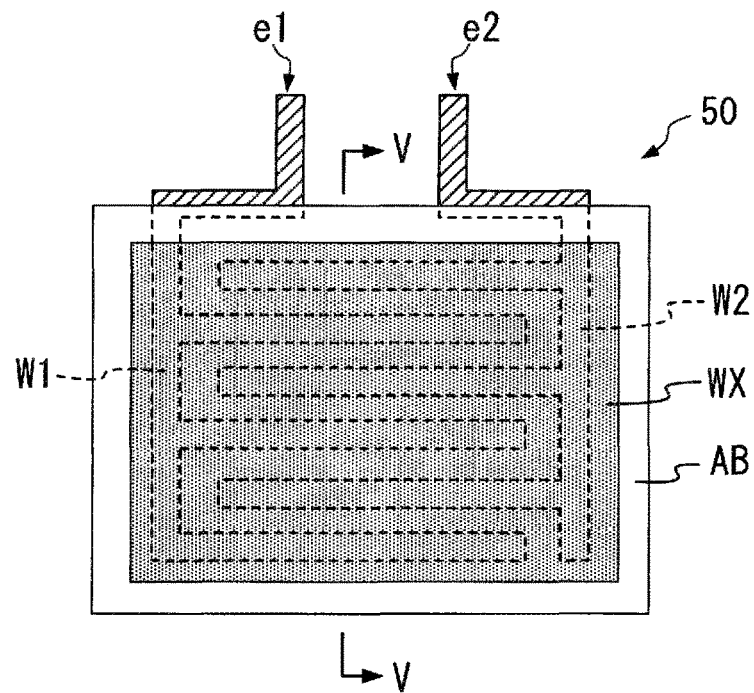
FIG. 10A is a plane view showing an improvement example of the sensor capacitor 50 having the configuration shown in FIG. 8A and FIG. 8B.
Figure 10B:
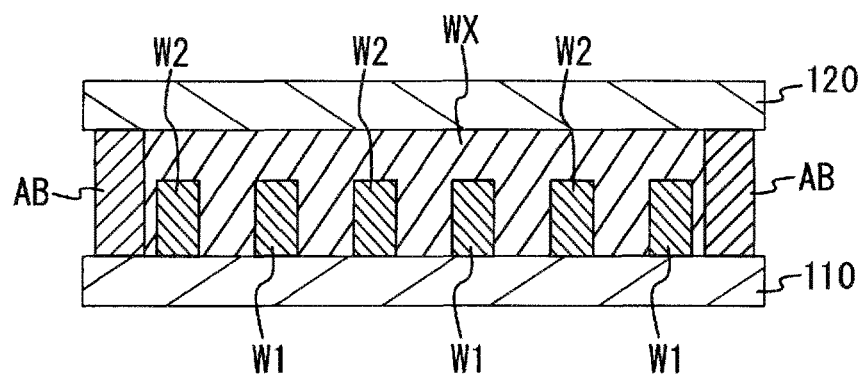
FIG. 10B is a cross-sectional view showing a cross-sectional structure of the sensor capacitor 50 along a V-V line shown in FIG. 10A.

FIG. 10A and FIG. 10B are diagrams showing an improvement example of the sensor capacitor 50 shown in FIG. 8A and FIG. 8B which is accomplished in view of this point. Besides, FIG. 10A is a plane view in which the sensor capacitor 50 is viewed through the protective plate 120 from the direction of the white arrow shown in FIG. 1, and FIG. 10B is a cross-sectional view showing a cross-sectional structure of the sensor capacitor 50 along a V-V line shown in FIG. 10A.

Figure 10C:
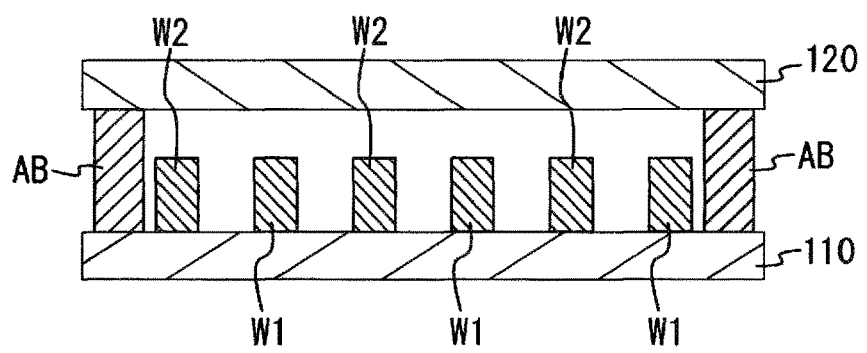
FIG. 10C is a cross-sectional view showing a cross-sectional structure of the sensor capacitor 50 along the V-V line shown in FIG. 10A after being exposed to a temperature higher than a predetermined temperature.

In the configuration shown in FIG. 10A and FIG. 10B, an absorber AB consisting of a material (for example, paper) for absorbing the liquefied wax is arranged to enclose all around the formation region of the wax WX. According to this configuration, the liquefied wax is absorbed by the absorber AB, and the wax WX nearly disappears from the space between the electrodes W1 and W2 as shown by the cross-sectional configuration in FIG. 10C.

Accordingly, a difference of the electrostatic capacitances before and after the liquefaction of the wax WX can be increased, and thus changes in the electrostatic capacitance can be detected with high precision.

Furthermore, according to the configuration shown in FIG. 10A and FIG. 10B, the liquefied wax can be extracted from the space between the electrodes W1 and W2 without depending on a direction or inclination in which the RFID sensor tag 100 is attached to an article. Accordingly, application of the RFID sensor tag 100 can be facilitated.

Besides, in the configuration shown in FIG. 10A and FIG. 10B, the absorber AB is arranged to enclose all around the formation region of the wax WX, but the absorber AB may also be arranged to enclose only a part of the formation region.

Figure 11:
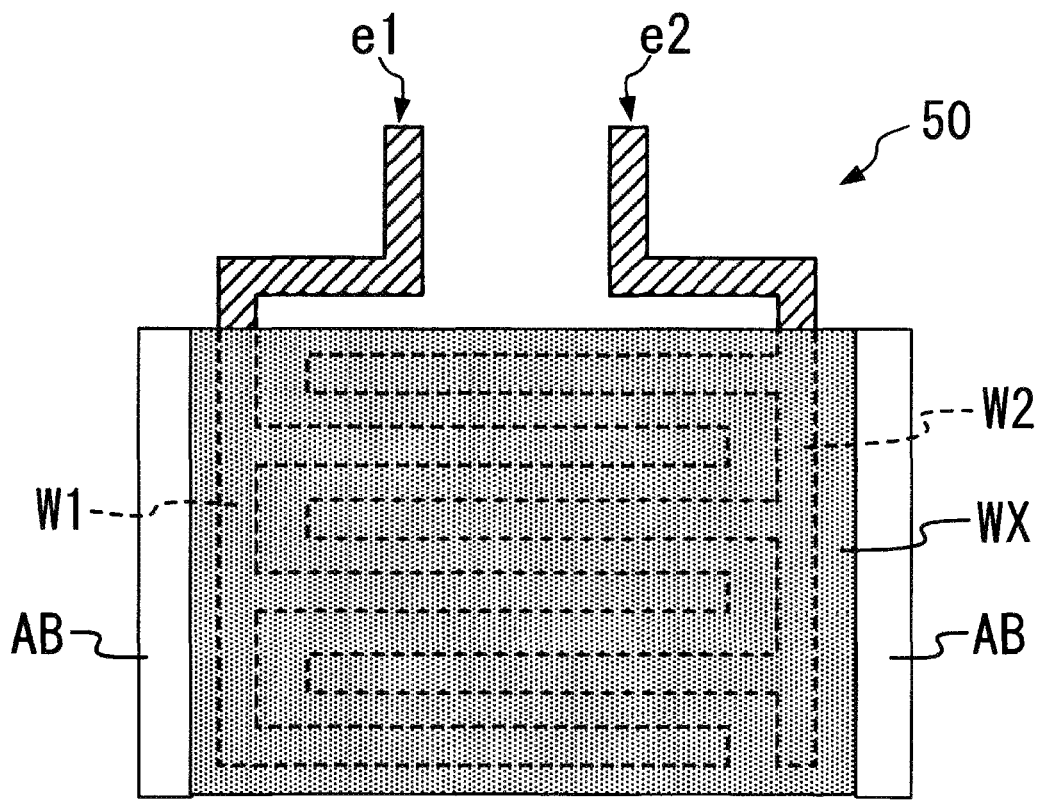
FIG. 11 is a plane view showing a variant of the sensor capacitor 50 having the configuration shown in FIG. 10A.
Figure 12:
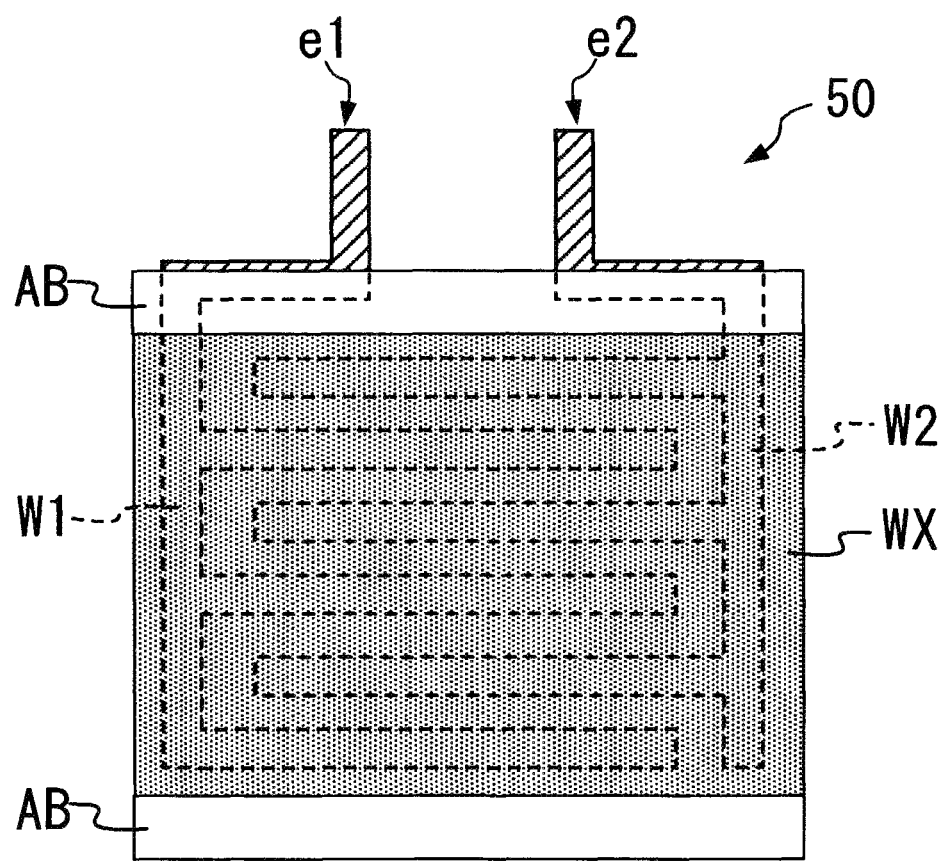
FIG. 12 is a plane view showing a variant of the sensor capacitor 50 having the configuration shown in FIG. 10A.

FIG. 11 and FIG. 12 are plane views showing the variant of the sensor capacitor 50 shown in FIG. 10A which is accomplished in view of this point.

According to the configuration shown in FIG. 11 and FIG. 12, although the absorption rate of the liquefied wax is reduced compared with FIG. 10A, the area of the absorber AB decreases, the electrode area of the electrodes W1 and W2 is increased accordingly, and an increase in the electrostatic capacitance can be achieved.

Besides, in the above example, electrodes having a rectangular shape are adopted as the comb-shaped electrodes W1 and W2, and accordingly, the absorber AB having a quadrilateral shape is also adopted. However, electrodes having a circular comb shape may also be adopted as the electrodes W1 and W2, and accordingly, the absorber AB which circularly encloses the electrodes W1, W2 and the formation region of the wax WX may also be adopted. Alternatively, electrodes having a rectangular comb shape as shown in FIG. 10A may be adopted as the electrodes W1 and W2, and an absorber having a circular shape may be adopted as the absorber AB which encloses the electrodes W1 and W2.

Meanwhile, when the RFID sensor tag 100 is manufactured, after devices such as the antennas 20a, 20b, the IC chip 10, the sensor capacitor 50 and the like are formed on the surface of the substrate 110 as shown in FIG. 2, these devices are sealed by the protective plate 120 as shown in FIG. 1. At this time, the wax WX liquefies during the sealing processing of the protective plate 120 if the melting point of the wax WX is lower than the temperature of heat applied in the seal processing.

Therefore, an opening portion may be arranged in advance in a region of the protective plate 120 that faces a scheduled formation region of the wax WX, and the wax WX is filled via the opening portion of the protective plate 120 after the sealing processing of the protective plate 120.

Figure 13:
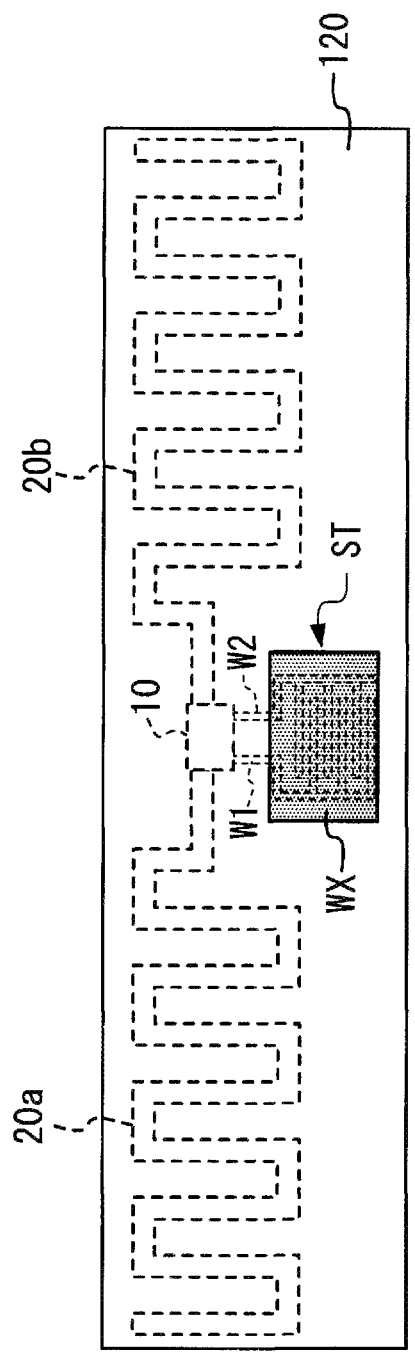
FIG. 13 is a plane view in which the protective plate 120 of another example is viewed from the direction of the white arrow shown in FIG. 1.

FIG. 13 is a plane view showing a form of the protective plate 120, in which the RFID sensor tag 100 accomplished in view of this point is viewed from the direction of white arrow shown in FIG. 1.

In the configuration shown in FIG. 13, an opening portion ST is arranged in a region of the protective plate 120, the region facing the region in which the electrodes W1 and W2 of the sensor capacitor 50 are formed. Accordingly, the wax WX can be filled via the opening portion ST of the protective plate 120 after the sealing processing of the protective plate 120 so as to uniformly cover the comb teeth of each of the electrode W1 and the electrode W2 and the space between the comb teeth, and thus the liquefaction of the wax WX during manufacturing can be avoided.

However, in the configuration as shown in FIG. 13, the electrodes W1 and W2 are exposed when the wax WX liquefies during practical use of the RFID sensor tag 100. Accordingly, there is a risk that the electrodes W1 and W2 are corroded due to moisture or the like, and property deterioration may be caused.

Figure 14A:
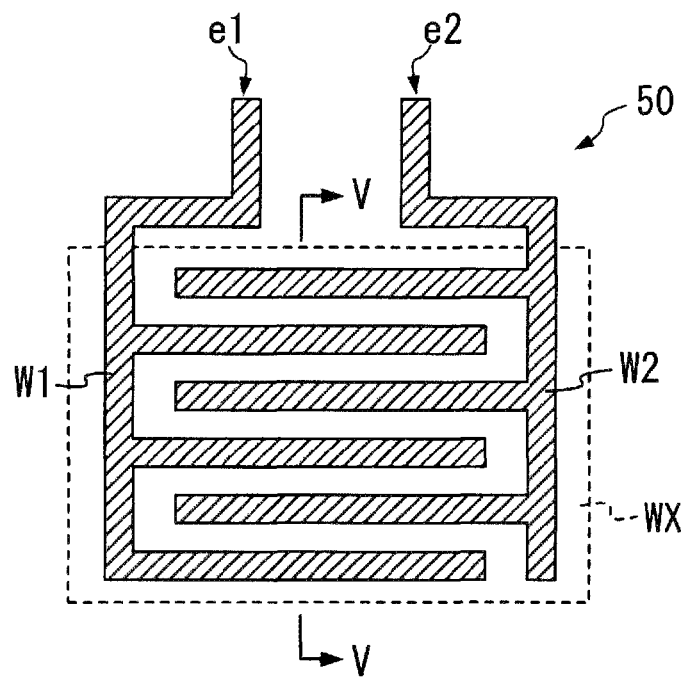
FIG. 14A is a plane view in which the sensor capacitor 50 of a second example is viewed through the protective plate 120 from the direction of the white arrow shown in FIG. 1.
Figure 14B:
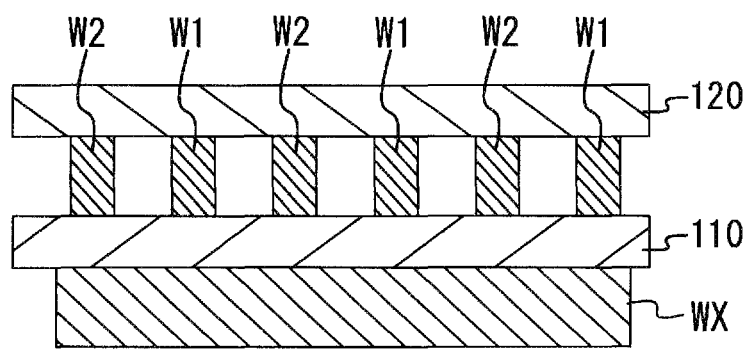
FIG. 14B is a cross-sectional view showing a cross-sectional structure of the sensor capacitor 50 along a V-V line shown in FIG. 14A.

FIG. 14A and FIG. 14B are diagrams showing a configuration of the sensor capacitor 50 of a second example accomplished in view of this point. Besides, FIG. 14A is a plane view in which the sensor capacitor 50 is viewed through the protective plate 120 from the direction of the white arrow shown in FIG. 1, and FIG. 14B is a cross-sectional view showing a cross-sectional structure of the sensor capacitor 50 along a V-V line shown in FIG. 14A.

In the configuration shown in FIG. 14A and FIG. 14B, for example, the sensor capacitor 50 is the same as the sensor capacitor shown in FIG. 7A and FIG. 7B in terms of including the comb-shaped electrodes W1 and W2 in which the comb teeth of the electrodes are disposed facing each other on one surface of the substrate 110 in a manner of being alternately juxtaposed.

In the configuration shown in FIG. 14A and FIG. 14B, the wax WX is arranged on one surface (also referred to as a lower surface) within the two surfaces of the substrate 110 on which the electrodes W1 and W2 are not formed instead of on the region sandwiched between the substrate 110 and the protective plate 120. In other words, as shown in FIG. 14B, the wax WX is arranged to uniformly cover a region of the lower surface of the substrate 110, the region facing the formation region of the electrodes W1 and W2.

Figure 15:
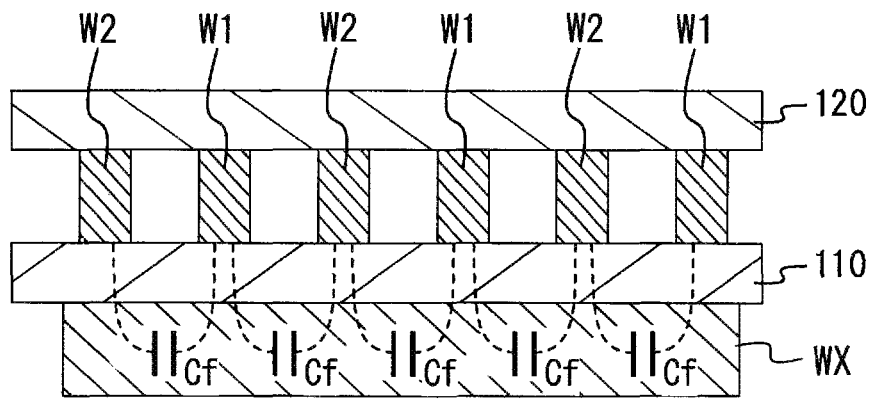
FIG. 15 is a cross-sectional view showing a cross-sectional structure along the V-V line shown in FIG. 14A, the cross-sectional view representing the parasitic capacitance Cf of the wax WX included in the sensor capacitor 50 having the configuration shown in FIG. 14B.

According to the configuration shown in FIG. 14B, although the wax WX used as a dielectric of the capacitor is not in contact with the electrodes W1 and W2, as shown in FIG. 15, the parasitic capacitance Cf obtained by the wax WX is generated via the substrate 110 between the electrodes W1 and W2 that are adjacent to each other.

In other words, when the wax WX is in a solid state, the sensor capacitor 50 is a capacitor having an electrostatic capacitance that is obtained by combining each parasitic capacitance Cf. Besides, when the wax WX liquefies and flows out of the formation region of the electrodes W1 and W2, the parasitic capacitance Cf cannot be obtained, and thus the electrostatic capacitance of the sensor capacitor 50 is reduced.

Accordingly, the capacitor in which the electrostatic capacitance changes corresponding to the ambient temperature can also be achieved in a case that the configuration shown in FIG. 14A and FIG. 14B is adopted as the sensor capacitor 50.

Figure 16:
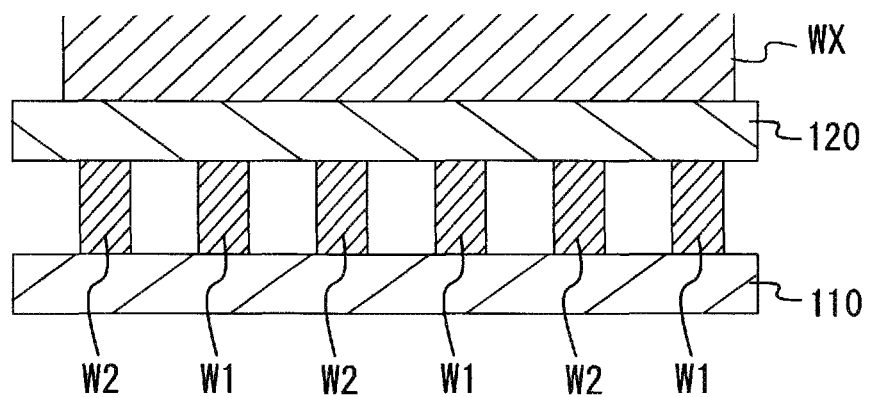
FIG. 16 is a cross-sectional view showing a cross-sectional structure along the V-V line of FIG. 14A, in which a variant of the sensor capacitor 50 shown in FIG. 14A

Besides, in one example shown in FIG. 14B, the wax WX is formed on the lower surface of the substrate 110, but as shown in FIG. 16, the wax WX may also be formed on a surface of the protective plate 120 that is opposite to the surface which the electrodes W1 and W2 face. In addition, in the above-described configuration shown in FIG. 14A and FIG. 14B or FIG. 16, similar to the configuration shown in FIG. 10A and FIG. 10B or FIG. 11 or FIG. 12, the absorber AB which absorbs the liquefied wax WX may also be disposed in a position adjacent to the formation region of the wax WX.

In this way, in the configuration shown in FIG. 14A and FIG. 14B, the wax WX is not in contact with the electrodes W1 and W2, and thus the solidified wax WX after liquefaction does not remain in a state of being attached to the electrodes W1 and W2. Thereby, compared with a case in which the configuration shown in FIG. 7A and FIG. 7B is adopted, a difference between the electrostatic capacitance when the wax WX is in an initial solid state and the electrostatic capacitance when the wax WX solidifies after liquefaction is larger, and the precision for detecting the changes in electrostatic capacitance increases accordingly. In addition, the place in which the liquefied wax WX solidifies is the surface of the RFID sensor tag 100, and thus the wax WX can be easily removed. Accordingly, the RFID sensor tag 100 can be reused.

Furthermore, according to the configuration of the second example shown in FIG. 14A and FIG. 14B or FIG. 16, manufacturing flexibility can be improved compared with a case in which the configuration of the first example (FIG. 7A, FIG. 7B, FIG. 8A, FIG. 8B, FIG. 10A, FIG. 10B, FIG. 11, FIG. 12) described above is adopted.

In the following, manufacturing methods in a case in which the RFID sensor tag 100 includes the sensor capacitor 50 of the first example and a case in which the RFID sensor tag 100 includes the sensor capacitor 50 of the second example are compared.

Figure 17:
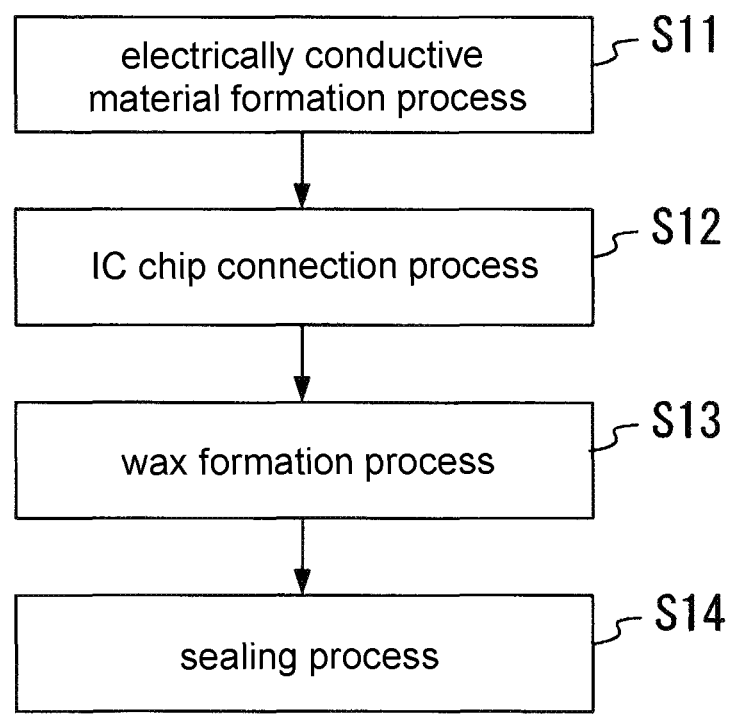
FIG. 17 is a flow chart showing a manufacturing procedure of the RFID sensor tag 100 including the sensor capacitor 50 of the first example.

FIG. 17 is a flow chart showing a manufacturing procedure of the RFID sensor tag 100 consisting of the configuration of the first example (for example, FIG. 7A, FIG. 7B).

First, on one surface of the substrate 110 consisting of PET or the like, the antennas 20a and 20b consisting of an electrically conductive material and having a plane pattern shown in FIG. 2, and the electrodes W1 and W2 consisting of the same electrically conductive material as the antennas 20a and 20b and having a comb-shaped plane pattern as shown in FIG. 7A are formed (electrically conductive material formation process S11).

Next, one end of each of the antennas 20a and 20b, the end portion e1 of the electrode W1, and the end portion e2 of the electrode W2 are respectively connected to four external terminals of the IC chip 10 (IC chip connection process S12).

Next, the wax WX used as a dielectric is filled between the electrodes W1 and W2 (wax formation process S13).

Next, the IC chip 10, the antennas 20a and 20b, and the electrodes W1 and W2 are sealed by heating the protective plate 120 consisting of PET or the like while attaching the protective plate 120 to one surface of the substrate 110 (protective plate sealing process S14).

Figure 18:
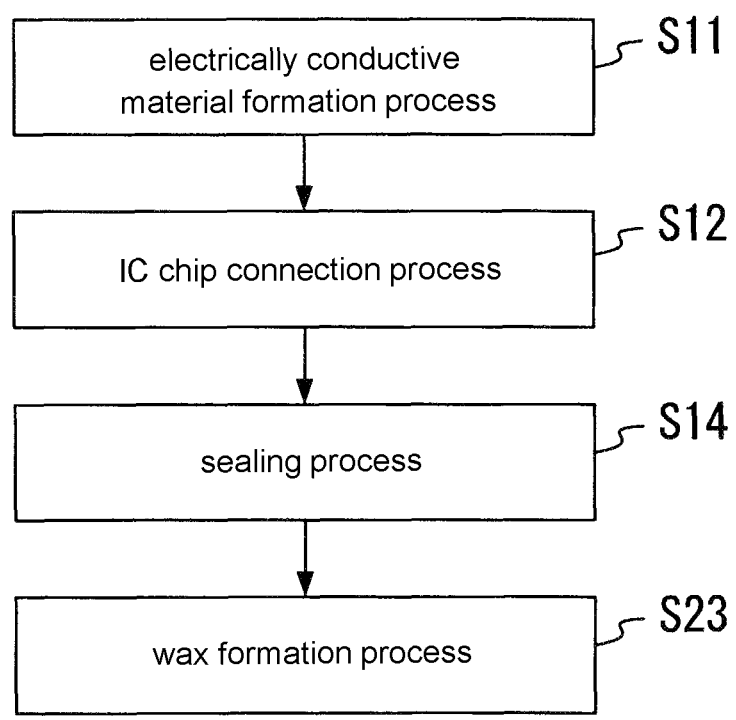
FIG. 18 is a flow chart showing a manufacturing procedure of the RFID sensor tag 100 including the sensor capacitor 50 of the second example.

On the other hand, FIG. 18 is a flow chart showing a manufacturing procedure of the RFID sensor tag 100 consisting of the configuration of the second example (for example, FIG. 14A, FIG. 14B).

When the configuration of the second example is adopted, as shown in FIG. 18, first, the electrically conductive material formation process S11 is performed in the same manner as in the case in which the configuration of the first example is adopted, and subsequently, the IC chip connection process S12 and the protective plate sealing process S14 described above are performed in order. Then, the wax formation process S23 is performed after completion of the protective plate sealing process S14.

In the wax formation process S23, the wax WX used as a dielectric is formed in a region on the other surface of the substrate 110 or the surface of the protective plate 120, the region facing the formation region of the electrodes W1 and W2.

Accordingly, the wax WX having a melting point lower than the heat applied to the protective plate 120 in the protective plate sealing process S14 can be used, and thus a threshold range of the temperature changes to be detected can be expanded.

In addition, according to the second example (FIG. 14A, FIG. 14B, FIG. 16), the electrically conductive material formation process S11, the IC chip connection process S12, and the protective plate sealing process S14 shown in FIG. 18 are performed in a manufacturing factory, but the wax formation process S23 is not required to be performed in the manufacturing factory. For example, in the manufacturing factory, the products obtained by the protective plate sealing process S14 shown in FIG. 18 are shipped. Then, in a place for delivering articles, for example, work in which a sheet-shaped wax WX having a melting point corresponding to the temperature required for article management is pasted to the lower surface of the substrate 110 is performed as the work of the wax formation process S23.

As described above, when the configuration of the second example (for example, FIG. 14A, FIG. 14B) is adopted as the sensor capacitor 50, the degree of freedom of a place and an implementation period for forming the wax which is the dielectric of the sensor capacitor 50 can be increased.

In addition, in the above example, the sensor capacitor 50 is a sensor capacitor in which the electrostatic capacitance changes in two steps corresponding to the changes in the ambient temperature; however, a sensor capacitor in which the electrostatic capacitance changes in a plurality of steps may also be achieved by using two or more kinds of waxes having mutually different melting points as the dielectrics.

Figure 19A:
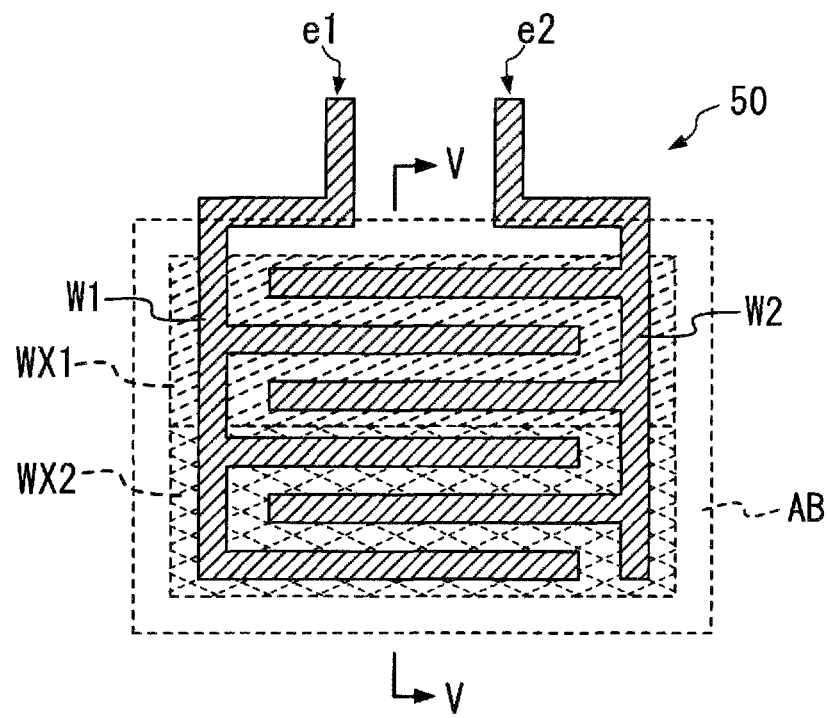
FIG. 19A is a plane view in which the sensor capacitor 50 of a third example is viewed through the protective plate 120 from the direction of the white arrow shown in FIG. 1.
Figure 19B:
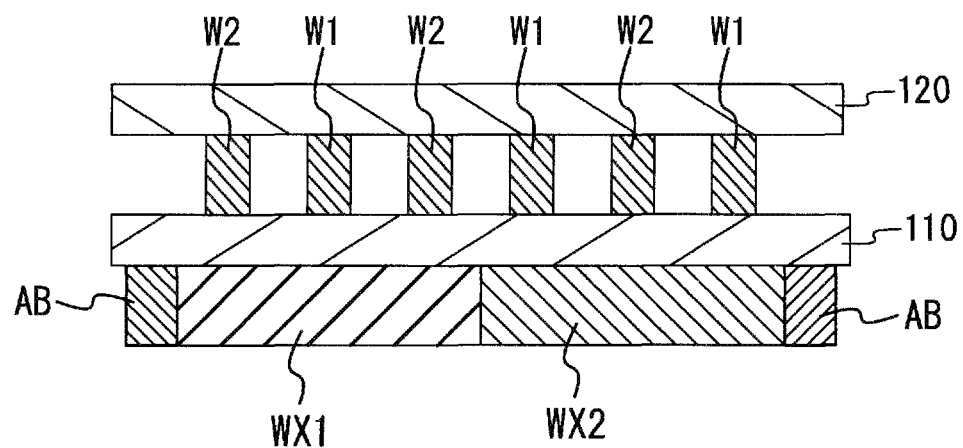
FIG. 19B is a cross-sectional view showing a cross-sectional structure of the sensor capacitor 50 along a V-V line shown in FIG. 19A.

FIG. 19A and FIG. 19B are diagrams showing a configuration of the sensor capacitor 50 of a third example accomplished in view of this point. Besides, FIG. 19A is a plane view in which the sensor capacitor 50 is viewed through the protective plate 120 from the direction of the white arrow shown in FIG. 1, and FIG. 19B is a cross-sectional view showing a cross-sectional structure of the sensor capacitor 50 along a V-V line shown in FIG. 19A.

In the configuration shown in FIG. 19A and FIG. 19B, the sensor capacitor 50 adopts the comb-shaped electrodes W1 and W2 which are similar to the electrodes shown in FIG. 7A and FIG. 7B. In addition, in the configuration shown in FIG. 19A and FIG. 19B, for example, similar to the configuration shown in FIG. 14A and FIG. 14B, the wax is formed on the lower surface of the substrate 110. Furthermore, in the configuration shown in FIG. 19A and FIG. 19B, similar to the configuration shown in FIG. 10A and FIG. 10B, the absorber AB which absorbs the liquefied wax is disposed around the formation region of the wax.

However, in the configuration shown in FIG. 19A and FIG. 19B, the formation region of the wax is divided into two sections, and wax WX1 having a first melting point is formed in the first section, and wax WX2 having a second melting point that is higher than the first melting point is formed in the second section.

Here, a case in which the first melting point is 20° C. and the second melting point is 80° C. is used as an example, and a transition of the electrostatic capacitance accompanying the changes in the ambient temperature in the sensor capacitor 50 shown in FIG. 19A and FIG. 19B and a temperature detection operation performed by the control portion 104 are described.

Besides, when the configuration shown in FIG. 19A and FIG. 19B is adopted as the sensor capacitor 50, information that represents a threshold electrostatic capacitance Cth1 for judging whether the ambient temperature exceeds 20° C. and a threshold electrostatic capacitance Cth2 for judging whether the ambient temperature exceeds 80° C. is stored in the memory 105.

When the RFID sensor tag 100 is brought close to the reader/writer 200 as shown in FIG. 3, the control portion 104 detects the electrostatic capacitance of the sensor capacitor 50, and a temperature judgment is performed as follows by comparing the detection result and the threshold electrostatic capacitances Cth1 and Cth2.

Figure 20:
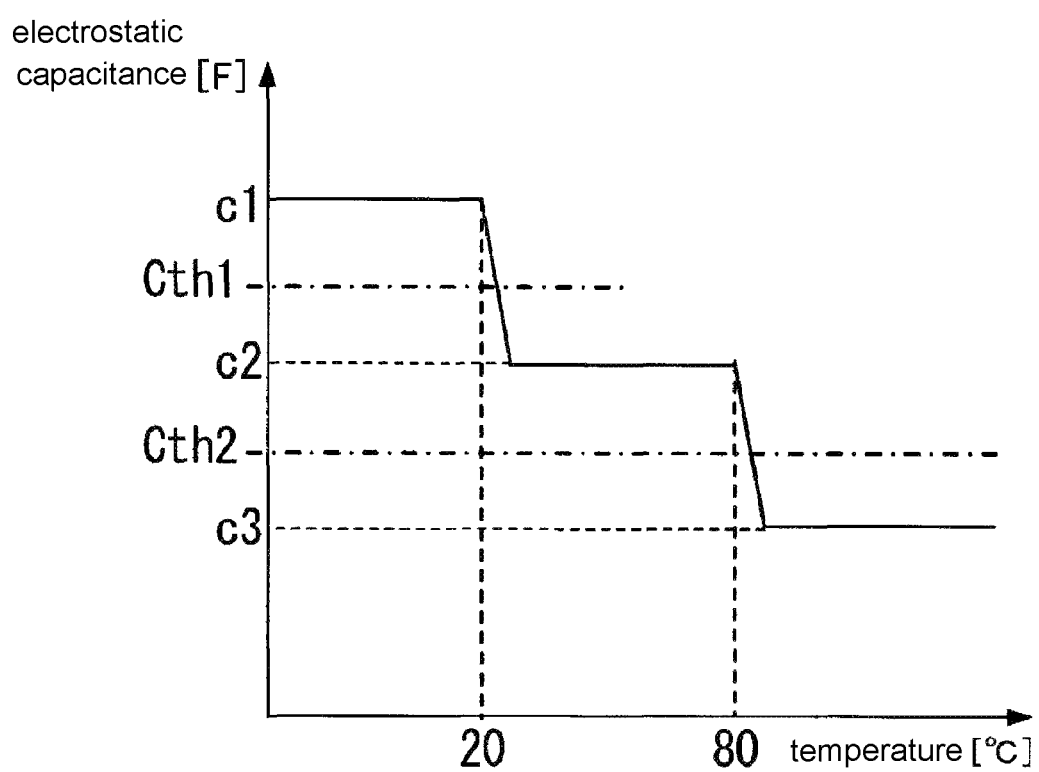
FIG. 20 is a diagram representing an electrostatic capacitance transition with respect to temperature changes in the sensor capacitor 50 shown in FIG. 19A and FIG. 19B.

First, when the RFID sensor tag 100 is not exposed to an environment of 20° C. or higher, the waxes WX1 and WX2 maintain a solid state as shown in FIG. 19A and FIG. 19B. At this time, as shown in FIG. 20, the electrostatic capacitance of the sensor capacitor 50 is an electrostatic capacitance c1 higher than the threshold electrostatic capacitance Cth1. Accordingly, when the RFID sensor tag 100 is brought close to the reader/writer 200 in this state, because the electrostatic capacitance c1 of the sensor capacitor 50 is higher than the threshold electrostatic capacitance Cth1, the control portion 104 generates environmental change information representing that the RFID sensor tag 100 is not exposed to the ambient temperature exceeding 20° C.

In addition, when the RFID sensor tag 100 is exposed to an environment of 20° C. or higher and 80° C. or lower, only the wax WX1 within the waxes WX1 and WX2 of the sensor capacitor 50 liquefies and is absorbed by the absorber AB.

Figure 21A:
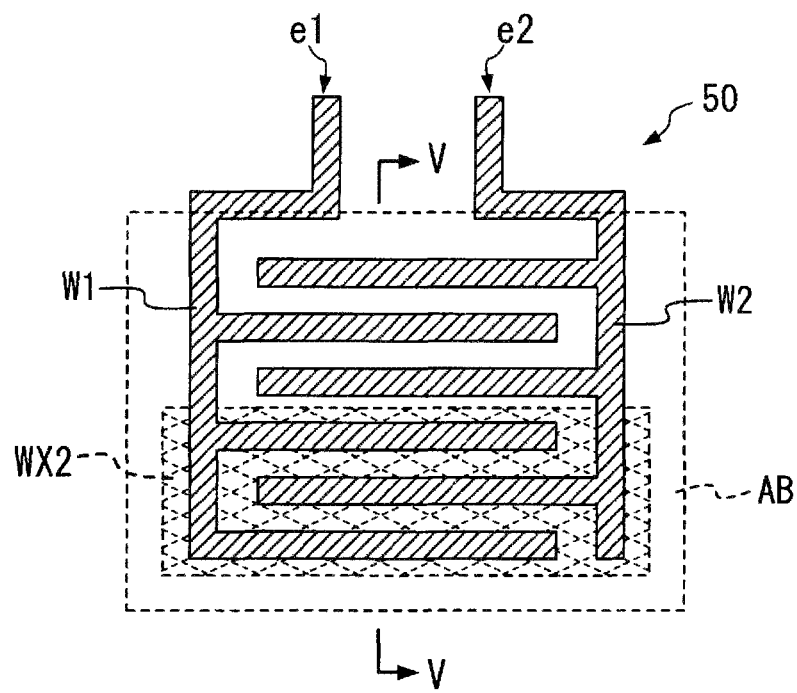
FIG. 21A is a plane view showing a form of the sensor capacitor 50 having the configuration shown in FIG. 19A when the sensor capacitor 50 is exposed to a temperature of 20° C. or higher.
Figure 21B:
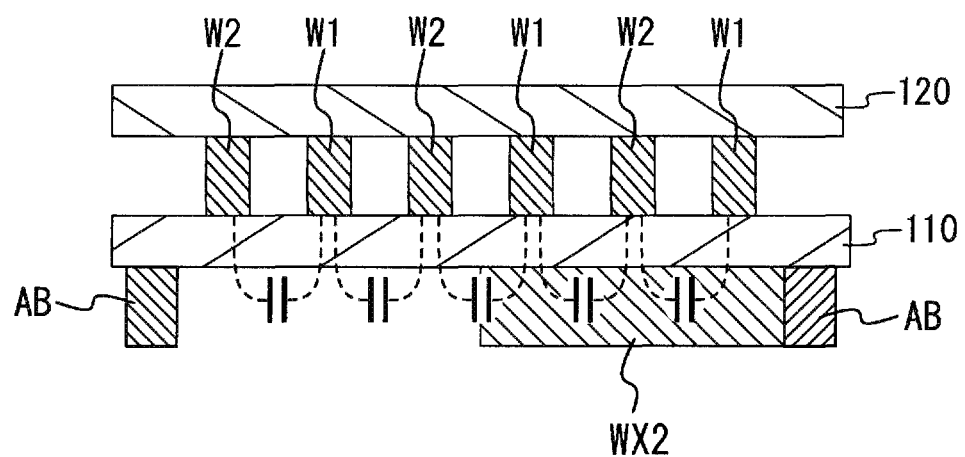
FIG. 21B is a cross-sectional view showing a cross-sectional structure of the sensor capacitor 50 along a V-V line shown in FIG. 21A.

Accordingly, at this time, the sensor capacitor 50 has a form as shown in FIG. 21A and FIG. 21B.

Besides, FIG. 21A is a plane view in which the sensor capacitor 50 is viewed through the protective plate 120 from the direction of the white arrow shown in FIG. 1, and FIG. 21B is a cross-sectional view showing a cross-sectional structure of the sensor capacitor 50 along a V-V line shown in FIG. 21A.

In summary, when the RFID sensor tag 100 is exposed to the environment of 20° C. or higher and 80° C. or lower, as shown in FIG. 21A and FIG. 21B, the wax WX1 used as the dielectric of the capacitor disappears. Thereby, as shown in FIG. 20, the electrostatic capacitance of the capacitor is an electrostatic capacitance c2 lower than the electrostatic capacitance c1. Accordingly, when the RFID sensor tag 100 is brought close to the reader/writer 200 in this state, because the electrostatic capacitance c2 of the sensor capacitor 50 is below the threshold electrostatic capacitance Cth1 and is higher than the threshold electrostatic capacitance Cth2, the control portion 104 generates environmental change information representing that the RFID sensor tag 100 is exposed to the ambient temperature of 20° C.-80° C.

In addition, when the RFID sensor tag 100 is exposed to an environment of 80° C. or higher, the waxes WX1 and WX2 of the sensor capacitor 50 liquefy and are absorbed by the absorber AB. Accordingly, at this time, the sensor capacitor 50 has a form as shown in FIG. 22A and FIG. 22B.

Figure 22A:
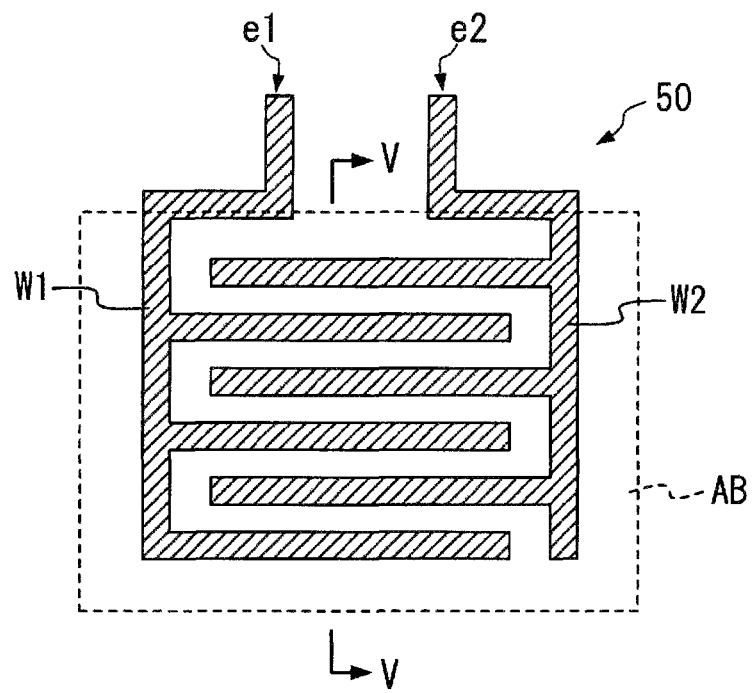
FIG. 22A is a plane view showing a form of the sensor capacitor 50 having the configuration shown in FIG. 19A when the sensor capacitor 50 is exposed to a temperature of 80° C. or higher.
Figure 22B:
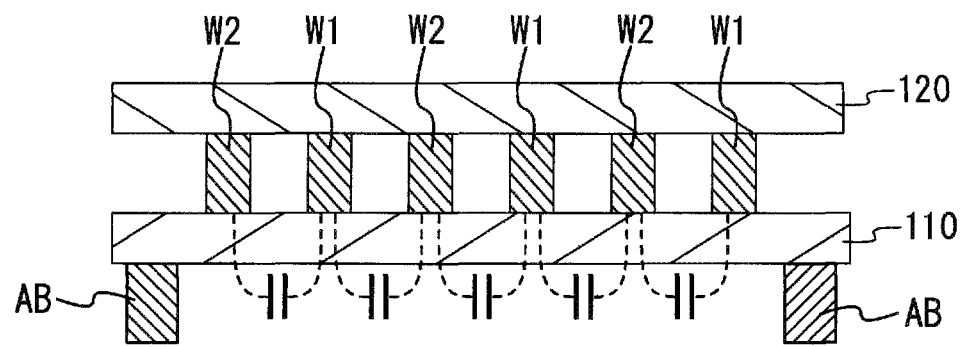
FIG. 22B is a cross-sectional view showing a cross-sectional structure of the sensor capacitor 50 along a V-V line shown in FIG. 22A.

Besides, FIG. 22A is a plane view in which the sensor capacitor 50 is viewed through the protective plate 120 from the direction of the white arrow shown in FIG. 1, and FIG. 22B is a cross-sectional view showing a cross-sectional structure of the sensor capacitor 50 along a V-V line shown in FIG. 22A.

In summary, when the RFID sensor tag 100 is exposed to the environment of 80° C. or higher, as shown in FIG. 22A and FIG. 22B, the waxes WX1 and WX2 used as dielectrics of the capacitor flow out. Thereby, as shown in FIG. 20, the electrostatic capacitance of the sensor capacitor 50 is an electrostatic capacitance c3 lower than the electrostatic capacitance c2. Accordingly, when the RFID sensor tag 100 is brought close to the reader/writer 200 in this state, because the electrostatic capacitance c3 of the sensor capacitor 50 is below the threshold electrostatic capacitance Cth2, the control portion 104 generates environmental change information representing that the RFID sensor tag 100 is exposed to the ambient temperature of 80° C. or higher.

Accordingly, by adopting the sensor capacitor 50 shown in FIG. 21A and FIG. 21B, the RFID sensor tag 100 can notify the reader/writer 200 of the environmental change information representing the ambient temperature at which the RFID sensor tag 100 is exposed in three stages of 20° C. or lower, 20° C.-80° C., and 80° C. or higher.

Figure 23:
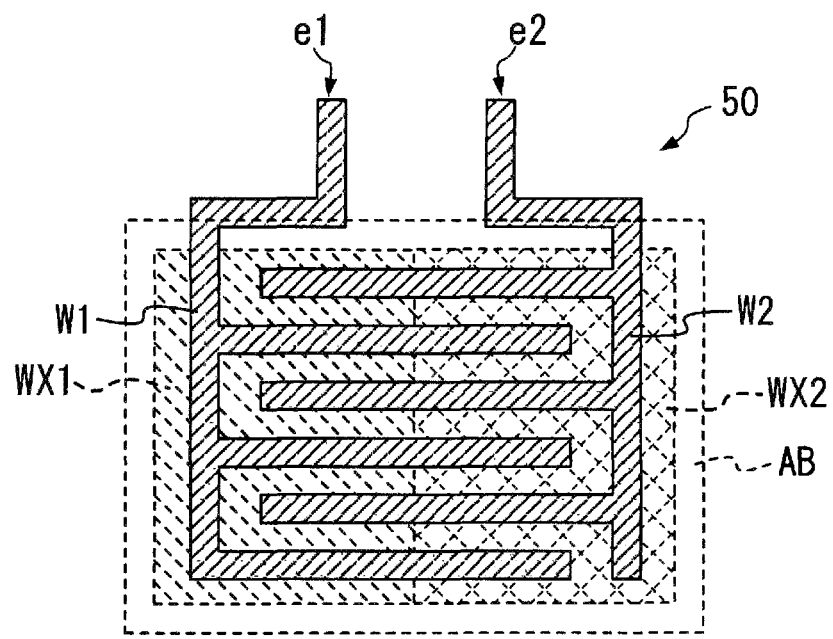
FIG. 23 is a plane view showing a variant of the sensor capacitor 50 shown in FIG. 19A.

Besides, when the formation region of the wax is divided into two sections according to the difference of the melting points, as shown in FIG. 23, the formation region may be divided into a section for the wax WX1 and a section for the wax WX2. In addition, similarly, in the configuration shown in FIG. 7A and FIG. 7B, a configuration may be adopted in which the formation region of the wax is divided into two sections as shown in FIG. 19A or FIG. 23 and the wax having a different melting point is filled in each section. In addition, three or more types of waxes having mutually different melting points may be prepared, and each wax may be arranged in each of a plurality of sections that is partitioned for each wax.

In addition, in the first-third examples described above, the configuration in which the electrostatic capacitance is reduced when the ambient temperature exceeds the melting point of wax is adopted as the sensor capacitor 50; however, a configuration in which the electrostatic capacitance increases when the ambient temperature exceeds the melting point of the wax may also be adopted. For example, as the sensor capacitor 50, the following sensor capacitor is adopted in which wax is formed in a position spaced apart from the electrodes W1 and W2 to a degree of not acting as the dielectric of the capacitor and in which an absorber that absorbs the liquefied wax when the wax liquefies and introduces the liquefied wax onto the electrodes W1 and W2 is arranged. According to this configuration, the electrostatic capacitance of the sensor capacitor 50 has the first capacitance corresponding to the dielectric constant of air when the ambient temperature is lower than a predetermined temperature, and transitions to a capacitance larger than the first capacitance to which the dielectric constant of wax is added when the ambient temperature is above the predetermined temperature. Accordingly, when the electrostatic capacitance of the sensor capacitor 50 is larger than the first capacitance, the RFID sensor tag 100 wirelessly transmits environmental change information representing that there is a chance to be exposed to a high temperature environment above the predetermined temperature.

In addition, instead of the above-described wax, a material in which the form thereof irreversibly changes from solid to liquid in response to humidity, vibration or the like may also be adopted as the dielectric of the sensor capacitor 50.

For example, as long as the form of the dielectric irreversibly changes from solid to liquid when the dielectric is exposed to an environment in which the humidity is above or below a predetermined humidity, humidity changes can be detected as the environmental changes. In addition, as long as the form of the dielectric irreversibly changes from solid to liquid in response to vibration above a predetermined degree, vibration reception can be detected as the environmental changes.

Figure 24:
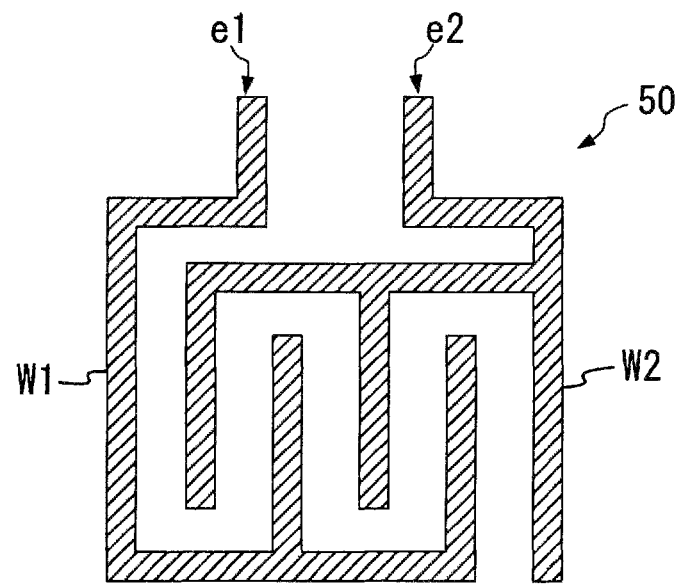
FIG. 24 is a plane view showing another example of an electrode form of the sensor capacitor 50.

In addition, in the above example, as the comb shape of the electrodes W1 and W2 in which the comb teeth of the electrodes are disposed facing each other in a manner of being alternately juxtaposed, for example, the plane pattern shown in FIG. 7A is adopted; however, the plane pattern as shown in FIG. 24 may also be adopted instead of the plane pattern shown in FIG. 7A.

In a word, as the RFID sensor tag 100 of the first example (FIG. 7A, FIG. 7B, FIG. 8A, FIG. 8B, FIG. 10A, FIG. 10B, FIG. 11, FIG. 12), any sensor tag in which the following antennas, capacitor, and IC chip are formed on the substrate may be used.

In other words, the antennas (20a, 20b) are disposed on one surface of the substrate (110). The capacitor (50) is a capacitive element in which the electrostatic capacitance irreversibly changes corresponding to the ambient environment, and includes the dielectric (WX) and the first and second electrodes (W1, W2) disposed on one surface of the substrate. The IC chip (10) includes the pair of external terminals (ta, tb) to which the first and second electrodes are respectively connected, detects the electrostatic capacitance of the capacitor (50) via the pair of external terminals, and wirelessly transmits the information corresponding to the detection result via the antennas.

Besides, as shown in the second example (for example, FIG. 14A, FIG. 14B, FIG. 16), the dielectric (WX) of the capacitor (50) is not required to be formed between the first and second electrodes.

In a word, as the RFID sensor tag 100 including this capacitor, any one in which the following antennas, capacitor, and IC chip formed on the substrate are sealed by a protective plate may be used.

In other words, the antennas (20a, 20b) are disposed on one surface of the substrate (110). The capacitor (50) is a capacitive element in which the electrostatic capacitance irreversibly changes corresponding to the ambient environment, and includes the first and second electrodes (W1, W2) disposed on one surface of the substrate. The IC chip (10) includes the pair of external terminals (ta, tb) to which the first and second electrodes are respectively connected, detects the electrostatic capacitance of the capacitor (50) via the pair of external terminals, and wirelessly transmits the information corresponding to the detection result via the antennas. The protective plate (120) is attached to one surface of the substrate (110) so as to seal the antennas, the capacitor, and the IC chip. At this time, the dielectric (WX) of the capacitor (50) is formed in a region on the other surface of the substrate (110) or the surface of the protective plate (120), the region facing the formation region of the first and second electrodes (W1, W2).

The embodiments of the disclosure provide, for example, an IC tag in which precision reduction can be suppressed and which is manufactured easily, and a manufacturing method of IC tag.

[Effect]

In the IC tag of the embodiments of the disclosure, the first and second electrodes constituting the capacitor in which the electrostatic capacitance changes corresponding to the changes in the ambient environment and the antennas for wirelessly transmitting information corresponding to the detection result of the electrostatic capacitance in the capacitor are disposed on the same surface of the substrate.

Accordingly, for example, in a process of forming the electrically conductive material for one time, the first and second electrodes constituting the above-described capacitor can be formed together with the antennas, and thus the manufacturing is facilitated.

Furthermore, in the IC tag, the first and second electrodes of the capacitor are directly connected to the pair of external terminals of the IC chip which detects the electrostatic capacitance of the capacitor and wirelessly transmits the information corresponding to the detection result via the antennas.

Accordingly, when the capacitor and the IC chip are connected electrically, for example, it is unnecessary to use a metal wire or the like, and the number of connection points thereof can be reduced.

Therefore, according to the embodiments of the disclosure, for example, manufacturing can be facilitated and reduction in detection precision of the electrostatic capacitance can be suppressed.

What is claimed is:

1. An integrated circuit (IC) tag, comprising:
a substrate;
antennas disposed on one surface of the substrate;
a capacitor which comprises a dielectric and first and second electrodes disposed on one surface of the substrate, and in which an electrostatic capacitance changes irreversibly corresponding to changes in ambient environment; and
an IC chip which comprises a pair of external terminals to which the first and second electrodes are respectively connected, detects the electrostatic capacitance of the capacitor via the pair of external terminals, and wirelessly transmits information based on a detection result via the antennas,
wherein the dielectric is formed so as to cover at least one portion of the first and second electrodes and a space between the first and second electrodes.

2. The IC tag according to claim 1, wherein the antennas and the first and second electrodes comprise the same electrically conductive material, and the antennas and the first and second electrodes are equal in height from the one surface.

3. The IC tag according to claim 1, wherein the first and second electrodes have a comb-shaped plane pattern in which comb teeth of the first and second electrodes are disposed facing each other in a manner of being alternately juxtaposed.

4. The IC tag according to claim 1, wherein the dielectric is formed between the first and second electrodes.

5. The IC tag according to claim 1, wherein the dielectric is formed so as to uniformly cover the first and second electrodes and the space between the first and second electrodes.

6. The IC tag according to claim 1, wherein the changes in the ambient environment mean that an ambient temperature changes from a state of being lower than a predetermined temperature to the predetermined temperature or higher, and
the dielectric is wax having a melting point of the predetermined temperature.

7. The IC tag according to claim 1, wherein the changes in the ambient environment are changes in an ambient temperature, and
the dielectric comprises a plurality of waxes having mutually different melting points.

8. The IC tag according to claim 6, wherein the capacitor comprises an absorber which absorbs the wax that is liquefied.

9. An IC tag, comprising:
a substrate;
antennas disposed on one surface of the substrate;
a capacitor which comprises first and second electrodes disposed on one surface of the substrate, and in which an electrostatic capacitance changes irreversibly corresponding to changes in ambient environment;
an IC chip which comprises a pair of external terminals to which the first and second electrodes are respectively connected, detects the electrostatic capacitance of the capacitor via the pair of external terminals and wirelessly transmits information based on a detection result via the antennas; and
a protective plate which is attached to one surface of the substrate so as to seal the antennas, the first and second electrodes, and the IC chip,
wherein a dielectric of the capacitor is formed so as to cover at least one portion of the first and second electrodes and a space between the first and second electrodes.

10. The IC tag according to claim 9, wherein the dielectric of the capacitor is formed in a region on the other surface of the substrate or the surface of the protective plate, the region facing a formation region of the first and second electrodes.

11. The IC tag according to claim 9, wherein the antennas and the first and second electrodes comprise the same electrically conductive material, and the antennas and the first and second electrodes are equal in height from the one surface.

12. The IC tag according to claim 9, wherein the first and second electrodes have a comb-shaped plane pattern in which comb teeth of the first and second electrodes are disposed facing each other in a manner of being alternately juxtaposed.

13. The IC tag according to claim 10, wherein the changes in the ambient environment mean that an ambient temperature changes from a state of being lower than a predetermined temperature to the predetermined temperature or higher, and
the dielectric is wax having a melting point of the predetermined temperature.

14. The IC tag according to claim 10, wherein the changes in the ambient environment are changes in an ambient temperature, and
the dielectric comprises a plurality of waxes having mutually different melting points.

15. The IC tag according to claim 13, wherein the capacitor comprises an absorber which absorbs the wax that is liquefied.

16. A manufacturing method of IC tag, comprising:
a first process for forming, on one surface of the substrate, antennas and first and second electrodes comprising an electrically conductive material;
a second process for connecting the antennas and the first and second electrodes to external terminals of an IC chip which detects an electrostatic capacitance between the first and second electrodes and wirelessly transmits information corresponding to a detection result via the antennas;
a third process for filling a dielectric between the first and second electrodes; and
a fourth process for attaching a protective plate which seals the antennas, the IC chip, and the first and second electrodes to one surface of the substrate,
wherein the dielectric is formed so as to cover at least one portion of the first and second electrodes and a space between the first and second electrodes.

17. A manufacturing method of IC tag, comprising:
a first process for forming, on one surface of the substrate, antennas and first and second electrodes comprise an electrically conductive material;
a second process for connecting the antennas and the first and second electrodes to external terminals of an IC chip which detects whether an electrostatic capacitance between the first and second electrodes changes and wirelessly transmits information corresponding to a detection result via the antennas;
a third process for attaching a protective plate which seals the antennas, the IC chip, and the first and second electrodes to one surface of the substrate; and
a fourth process for forming a dielectric so as to cover at least one portion of the first and second electrodes and a space between the first and second electrodes.

18. The manufacturing method of IC tag according to claim 17, wherein the dielectric is formed in a region on the other surface of the substrate or the front surface of the protective plate, the region facing the formation region of the first and second electrodes.

* * * * *